(12) United States Patent
Matsuyama et al.

(10) Patent No.: US 6,276,134 B1
(45) Date of Patent: Aug. 21, 2001

(54) APPARATUS FOR CONTROLLING A PLURALITY OF HYDRAULIC MOTORS AND A CLUTCH

(75) Inventors: Nobuo Matsuyama, Sakado; Masao Fukuda, Kawagoe; Hiroaki Inoue, Hiratsuka; Masanori Ikari, Sayama, all of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/211,092

(22) Filed: Dec. 14, 1998

(30) Foreign Application Priority Data

Dec. 12, 1997 (JP) .................................................. 9-362756

(51) Int. Cl.7 .............................. F16H 47/02; F16D 31/02
(52) U.S. Cl. ................................ 60/425; 60/436; 60/441; 60/447; 60/448; 91/506; 475/73; 475/75; 475/76; 475/80
(58) Field of Search .............................. 60/425, 436, 441, 60/447, 448, 443; 91/506, 519; 475/73, 75, 76, 80

(56) References Cited

U.S. PATENT DOCUMENTS 3,074,296 * 1/1963 Ebert ........................................ 475/75
3,300,000 * 1/1967 Stoyke ...................................... 60/425
5,518,461 * 5/1996 Pfordt ....................................... 475/73

FOREIGN PATENT DOCUMENTS 1174778   12/1969   (GB) .

* cited by examiner

Primary Examiner—F. Daniel Lopez
(74) Attorney, Agent, or Firm—Sidley Austin Brown & Wood

(57) ABSTRACT

An apparatus, for controlling a plurality of hydraulic motors and a clutch for driving a drive shaft, can prevent a speed change shock and a load slip of a hydraulic motor as well as making a structure simple. The apparatus includes: a first volume variable hydraulic motor (1), connected to the drive shaft (3) through the clutch (5); a second volume variable hydraulic motor (2), which is always connected to the drive shaft (3); first tilt rotation control means (7, 8), for controlling a tilt rotation amount (a discharge volume cc/rev) of the first hydraulic motor by receiving a drive side pressurized oil (Pac) of the first hydraulic motor; and a zero tilt rotation holding means (10, 10A), for holding the tilt rotation amount of the first hydraulic motor at substantially zero in a state wherein the tilt rotation amount of the first hydraulic motor is controlled to be substantially zero.

19 Claims, 7 Drawing Sheets

(LOW SPEED Lo RANGE)

PRIOR ART (HIGH SPEED Hi RANGE)

APPARATUS FOR CONTROLLING A PLURALITY OF HYDRAULIC MOTORS AND A CLUTCH

FIELD OF THE INVENTION

The present invention relates to an apparatus for controlling a plurality of hydraulic oil motors and a clutch, which apparatus is structured so as to provide the output torque of the plurality of hydraulic motors in accordance with a connection of the clutch in a hydraulic drive apparatus for a working machine, such as a wheel loader, a hydraulic excavator, or the like.

BACKGROUND OF THE INVENTION

In a hydraulic oil traveling drive apparatus for a vehicle which is driven by connecting the output torque of a plurality of hydraulic oil motors by means of a clutch; the output torque, the vehicle speed, and the like are conventionally controlled by connecting or disconnecting the clutch when the vehicle speed becomes a predetermined value.

FIG. 7 is a control circuit of a conventional control apparatus for a plurality of hydraulic oil motors and a clutch. The control circuit is constituted by the hydraulic oil pump 50, the first hydraulic oil motor 51, the second hydraulic oil motor 52, the clutch 53, a hydraulic oil pump 54, and the like. The first hydraulic oil motor 51 and the second hydraulic oil motor 52 are connected to the hydraulic oil pump 50 in parallel, and are driven by pressurized oil discharged by the hydraulic oil pump 50. The first motor gear 51b is fixed to the first output shaft 51a of the first hydraulic oil motor 51, and the first motor gear 51b is engaged with the gear 55a, which is fixed to the drive shaft 55 for driving the vehicle. The output torque of the first hydraulic motor 51 is always transmitted to the drive shaft 55 via the first motor gear 51b and the drive shaft gear 55a.

The clutch 53 is provided in the output shaft 52a of the second hydraulic motor 52. The second motor gear 53b, for the second hydraulic motor 52, is fixed to the second output shaft 53a of the clutch 53, and the second motor gear 53b is engaged with the gear 55a for the drive shaft 55. When the clutch 53 is engaged, the output torque of the second hydraulic motor 52 is transmitted to the drive shaft 55 for driving the vehicle via the clutch 53, the second motor gear 53b, and the drive shaft gear 55a. A servo valve is attached to each of the first and second hydraulic motors 51 and 52, and the discharge volume (cc/rev) of each of the first and second hydraulic motors 51 and 52 is controlled in accordance with a pressure signal from a high and low valve (hereinafter, referred to as an HL valve, not shown) for selecting between a high speed and a low speed.

The hydraulic oil pump 54 is connected to the drive shaft gear 55a via the pump gear 54a and the second motor gear 53b. The shuttle valve 54c, positioned in the conduit 54e, and the throttle 54b are connected in parallel between the Fp port and the Rp port of the hydraulic oil pump 54. When a rotating speed of the drive shaft 55 (corresponding to the vehicle speed) becomes equal to or greater than a predetermined speed value, the discharge pressure of the hydraulic oil pump 54 reaches a predetermined pressure value which disengages the clutch 53 via the conduit 54d. When the rotating speed of the drive shaft 55 is less than the predetermined speed value, the discharge pressure of the hydraulic oil pump 54 does not reach the predetermined pressure value, so that the clutch 53 is still engaged. Further, the hydraulic pump 50 and the first hydraulic motor 51 are always connected to each other; however, the communicating and shutting valve 56 is interposed in the conduit 54f between the hydraulic pump 50 and the second hydraulic motor 52, so that in a first position of the valve 56 the second hydraulic motor 52 is isolated from the hydraulic pump 50, and in a second position of the valve 56 the second hydraulic motor 52 is connected to the hydraulic pump 50.

A function of the communicating and shutting valve 56 will be described. When a tilt rotation amount is present in the second hydraulic motor 52, a speed changing shock is generated by a disengaging of the clutch 53; therefore, the tilt rotation amount of the second hydraulic oil motor 52 is set to be zero (hereinafter, referred to as a zero tilt rotation) before disengaging the clutch 53. However, since there is no means provided for holding the zero tilt rotation position for the second hydraulic motor 52, when even just a little tilt rotation amount is provided at the second hydraulic motor 52, due to a sudden speed change or the like after setting the second hydraulic motor 52 to be at the zero tilt rotation (refer to the broken line S5 in FIG. 9), the second hydraulic motor 52 races and a load slip of the first hydraulic motor 51 is generated. In order to prevent the load slip, after the second hydraulic oil motor 52 is set to be at the zero tilt rotation, the conduit 54f, which connects the hydraulic pump 50 to the second hydraulic motor 52, is shut by the communicating and shutting valve 56 at the same time as the clutch 53 is disengaged.

An operation of the conventional control circuit will be described below. FIG. 8 shows the relation between the hydraulic motor discharge volume (cc/rev) and the vehicle speed (km/h) in the low speed range Lo. The curve S1 shows the relation for the first hydraulic motor 51, and the curve S2 shows the relation for the second hydraulic motor 52. For example, since the wheel loader is structured such that the discharge pressure of the hydraulic pump 54 does not reach a predetermined pressure value until the vehicle speed is 12 km/h, the clutch 53 is in the engaged state. Accordingly, the wheel loader is driven by a large drive force, corresponding to the sum (S1+S2) of the discharge volumes of the first hydraulic motor 51 and the second hydraulic motor 52. In this case, when it is set to the low range Lo by the HL valve (not shown), the discharge volumes of the first hydraulic motor 51 and the second hydraulic motor 52 are limited, and the maximum vehicle speed is increased only to 12 km/h.

FIG. 9 shows the relation between the hydraulic motor discharge volume (cc/rev) and the vehicle speed (km/h) in the high speed range Hi. The curve S3 shows the relation for the first hydraulic motor 51, and the curve S4 shows the relation for the second hydraulic motor 52. In this case, since the discharge pressure of the hydraulic pump 54 does not reach the predetermined pressure value until the vehicle speed is 15 km/h, the clutch 53 is in the engaged state. When the vehicle speed is near 15 km/h, the discharge volume S4 of the second hydraulic motor 52 approaches zero. Thus, when it is set to the high speed range Hi by the HL valve (not shown), the limit of the discharge volume of the first hydraulic motor 51 is canceled, and the vehicle speed is increased to 30 km/h or more by only the discharge volume S3 of the first hydraulic motor 51. Further, when the vehicle speed is 15 km/h or more, the discharge pressure of the hydraulic pump 54 reaches the predetermined pressure value, and the clutch 53 is disengaged.

In the conventional hydraulic oil traveling drive apparatus described above, since the communicating and shutting valve 56 must be a large size so that the total discharge amount of the second hydraulic motor 52 can pass therethrough, there is a problem in that the cost for the piping and for the communicating and shutting valve 56 is great, and a large space is necessary. Further, since it is necessary to shut the communicating and shutting valve 56 at the same time as disengaging the clutch 53, a speed changing shock and the like are generated when this delicate timing is not satisfied. Further, in the case of fixing each of the first and second hydraulic motors 51 and 52 with a large tilt rotation amount and increasing the brake torque so as to reduce the vehicle speed, there is a case wherein the vehicle overruns when the fixed tilt rotation amount is still large and is suddenly canceled. Accordingly, it is necessary to hold the tilt rotation amount, increased during the speed reduction, until a cancel instruction is outputted.

SUMMARY OF THE INVENTION

The present invention is made by taking the problems in the prior arts into consideration, and an object of the present invention is to provide an apparatus for controlling a plurality of hydraulic oil motors and a clutch, which can provide a simplified structure by omitting a communicating and shutting valve for handling the maximum throughput of one of the hydraulic oil motors, which can make it unnecessary to perform a control requiring a delicate timing of the clutch and the communicating and shutting valve, and which can prevent a speed change shock and a load slip of a hydraulic oil motor.

In accordance with a first aspect of the present invention, there is provided an apparatus for controlling a plurality of hydraulic oil motors and a clutch, in which a single drive shaft is driven by the output of the plurality of hydraulic oil motors, with one of the plurality of hydraulic oil motors driving the drive shaft via the clutch, the apparatus comprising:

a first hydraulic oil motor, of a volume variable type, connected to the drive shaft via the clutch;

a second hydraulic oil motor, of a volume variable type, always connected to the drive shaft;

first tilt rotation control means, for controlling the tilt rotation amount of the first hydraulic oil motor responsive to a drive side oil pressure of the first hydraulic oil motor; and a zero tilt rotation holding means, for holding a substantially zero tilt rotation amount for the first hydraulic oil motor in a state wherein the first hydraulic oil motor is controlled to the substantially zero tilt rotation amount.

In accordance with the structure mentioned above, when the first hydraulic oil motor is held at the state of the substantially zero tilt rotation amount by the zero tilt rotation holding means, the entire amount of oil discharged from the hydraulic oil pump is supplied only to the second hydraulic oil motor, and the drive shaft is driven only by the second hydraulic oil motor. Accordingly, the torque of the drive shaft is reduced to the degree that the first hydraulic oil motor has the zero tilt rotation; however, the rotating speed of the second hydraulic oil motor (that is, the rotating speed of the drive shaft) is increased to the degree of the oil amount which was otherwise available for driving the first hydraulic oil motor. Therefore, since it is unnecessary to provide the communicating and shutting valve for handling the maximum throughput of one of the hydraulic oil motors in accordance with the prior art, the structure can be made compact and at a low cost, so that a high speed drive can be performed at a low torque.

In accordance with a second aspect of the invention, as defined by the first aspect, there is provided an apparatus for controlling a plurality of hydraulic oil motors and a clutch, in which the first tilt rotation control means is provided with a first tilt rotation cylinder, for controlling the tilt rotation amount of the first hydraulic oil motor, and a first servo valve, for receiving the drive side oil pressure of the first hydraulic oil motor so as to output a control pressure to the first tilt rotation cylinder; and the zero tilt rotation holding means is provided with a zero tilt rotation holding valve, for controlling the first servo valve in a direction that the first tilt rotation cylinder reduces the tilt rotation amount of the first hydraulic oil motor, and stopper means for stopping the first tilt rotation means at a position where the tilt rotation amount of the first hydraulic oil motor is substantially zero.

In accordance with the structure mentioned above, the zero tilt rotation holding valve controls the first servo valve so as to reduce the tilt rotation amount of the first hydraulic motor by the first tilt rotation cylinder. The tilt rotation amount of the first hydraulic motor is stopped substantially at the zero tilt rotation amount position by the stopper means and is held at that position. As mentioned above, since the first hydraulic motor is securely held substantially at the zero tilt rotation amount position, the reliability is improved. Further, since it is sufficient to add the zero tilt rotation holding valve and the stopper means as the zero tilt rotation holding means, the cost therefor can be reduced.

In accordance with a third aspect of the invention, as defined by the second aspect, there is provided an apparatus for controlling a plurality of hydraulic oil motors and a clutch, in which the stopper means is provided with a stopper, which is fixed to a piston rod of the first tilt rotation cylinder, and a stopper cylinder, which has a piston rod which can be brought into contact with the stopper.

In accordance with the structure mentioned above, the stopper, fixed to the piston rod of the first tilt rotation cylinder, is stopped at a position in contact with the piston rod of the stopper cylinder, that is, substantially at the zero tilt rotation amount position of the first hydraulic oil motor. Since the structure is made such that the stopper is fixed to the piston rod of the existing first tilt rotation cylinder, a commercially available cylinder can be employed for the stopper cylinder and a cost therefor can be reduced. Further, since the structure is purely mechanical, the reliability thereof is high. Still further, since the commercially available cylinder can be structured such that the stroke end can be easily adjusted from an outer portion of the cylinder by additionally working, for example, a stopper bolt or the like, the zero tilt rotation amount position of the first hydraulic oil motor can be easily adjusted.

In accordance with a fourth aspect of the invention, as defined by the first, second or third aspects, the apparatus, for controlling a plurality of hydraulic oil motors and a clutch, further comprises: clutch switching means, for switching the clutch between an engaged state and a disengaged state; and a controller for outputting a command to the clutch switching means, which, at a time of increasing the speed of the drive shaft, holds the tilt rotation amount of the first hydraulic oil motor at substantially zero by the zero tilt rotation holding means and thereafter disengages the clutch, and which, at a time of reducing the speed of the drive shaft, engages the clutch before canceling the holding action of maintaining the tilt rotation amount of the first hydraulic oil motor at substantially zero.

In accordance with the structure mentioned above, for example, even in the case wherein the vehicle suddenly changes speed, the tilt rotation amount of the first hydraulic oil motor is held at zero or the holding action is canceled, without relation to a speed increase or a speed reduction of the drive shaft in a state wherein the clutch is always engaged. Accordingly, since the first hydraulic oil motor does not have tilt rotation from zero in a state wherein the clutch is disengaged, a load slip of the second hydraulic oil motor, caused by a racing of the first hydraulic oil motor, can be securely prevented. Further, since the clutch is disengaged at a time of driving at a high speed and a low torque, there is no energy loss caused by a stirring resistance of the oil within the first hydraulic oil motor and the like; and an increase of the oil temperature can be prevented. Still further, since it is not necessary to provide the communicating and shutting valve for handling the maximum throughput of one of the hydraulic oil motors in accordance with the prior art, a space therefor is unnecessary; thus, the structure can be made compact and at a low cost, and a speed change shock can be securely prevented.

In accordance with a fifth aspect of the invention, as defined by the first aspect, the apparatus, for controlling a plurality of hydraulic oil motors and a clutch, further comprises: clutch switching means, for switching the clutch between an engaged state and a disengaged state; a rotation sensor, for detecting the rotating speed of the drive shaft; and a controller for:

(a) inputting a rotating drive shaft speed signal from the rotation sensor, (b) outputting to the zero tilt rotation holding means:
  at a time of increasing the speed of the drive shaft, a command that cancels the holding action, for maintaining the tilt rotation amount of the first hydraulic oil motor at substantially zero, in a state wherein the rotating speed of the drive shaft is equal to or less than a first predetermined speed, and that holds the tilt rotation amount of the first hydraulic oil motor at substantially zero in a state wherein the rotating speed of the drive shaft is greater than the first predetermined speed, and
  at a time of decreasing the speed of the drive shaft, a command that holds the tilt rotation amount of the first hydraulic oil motor at substantially zero in a state wherein the rotating speed of the drive shaft is equal to or greater than a second predetermined speed, and that cancels the holding action, for maintaining the tilt rotation amount of the first hydraulic oil motor at substantially zero, in a state wherein the rotating speed of the drive shaft is less than the second predetermined speed, and (c) outputting to the clutch switching means:
  at a time of increasing the speed of the drive shaft, a command that disengages the clutch after holding the tilt rotation amount of the first hydraulic oil motor at substantially zero, and
  at a time of decreasing the speed of the drive shaft, a command that engages the clutch before canceling the holding action, for maintaining the tilt rotation amount of the first hydraulic oil motor at substantially zero.

In accordance with the structure mentioned above, in addition to the same operation and effect as those of the fourth aspect, it is possible to optionally set the predetermined speed for switching between the holding action for maintaining the tilt rotation amount of the first hydraulic motor at substantially zero and the predetermined speed for the canceling thereof to different predetermined values at the time of increasing the speed of the drive shaft and the time of decreasing the speed of the drive shaft, respectively. Accordingly, a hunting of the control can be prevented, and an appropriate value can be set so that a shock at a time of reducing the speed is minimized and an acceleration performance at a time of increasing the speed is maximized.

Further, since the controller can select an optimum combination of the first hydraulic motor and the second hydraulic motor required for increasing or decreasing the speed so as to drive in accordance with the rotating speed of the drive shaft, an efficient drive having a smaller power loss can be accurately performed.

In accordance with a sixth aspect of the invention, as defined in the fifth aspect, the apparatus, for controlling a plurality of hydraulic oil motors and a clutch, further comprises: a second tilt rotation cylinder, for controlling the tilt rotation amount of the second hydraulic motor; a second servo valve, for outputting a control pressure to the second tilt rotation cylinder in accordance with the higher of the pressure of a suction conduit and the pressure of the discharge conduit of the second hydraulic oil motor; and a maximum tilt rotation holding valve, for controlling the second servo valve, so that the second tilt rotation cylinder holds the tilt rotation amount of the second hydraulic oil motor at the maximum; in which, at a time of increasing the speed of the drive shaft, the controller outputs, to the maximum tilt rotation holding valve, a signal which holds the tilt rotation amount of the second hydraulic motor to the maximum value when canceling the holding action of maintaining the tilt rotation amount of the first hydraulic motor to be substantially zero, and which cancels the holding action for maintaining the tilt rotation amount of the second hydraulic motor to be the maximum value when holding the tilt rotation amount of the first hydraulic motor to be substantially zero; and in which, at a time of decreasing the speed of the drive shaft, the controller outputs, to the maximum tilt rotation holding valve, a signal which cancels the holding action of maintaining the tilt rotation amount of the second hydraulic motor at a maximum value when holding the tilt rotation amount of the first hydraulic motor at substantially zero and holds the tilt rotation amount of the second hydraulic motor at the maximum value when canceling the holding action of maintaining the tilt rotation amount of the first hydraulic motor at substantially zero.

In accordance with the structure mentioned above, at a time of increasing the speed of the drive shaft, since the holding action, of maintaining the tilt rotation amount of the second hydraulic motor at zero, is canceled even when the tilt rotation amount of the second hydraulic motor is still maximum, the tilt rotation amount of the first hydraulic motor is decreased and the rotating speed of the drive shaft is increased. Further, since the holding action, of maintaining the tilt rotation amount of the second hydraulic motor at the maximum, is canceled even when the tilt rotation amount of the first hydraulic motor becomes zero and is held at the zero tilt rotation amount, the tilt rotation amount of the second hydraulic motor is decreased and the rotating speed of the drive shaft is increased.

At a time of decreasing the speed of the drive shaft, the responsiveness of changing speed is improved, since the tilt rotation amount of the first hydraulic motor is still the zero tilt rotation amount, and the tilt rotation amount of the second hydraulic motor becomes the maximum due to the brake pressure so as to obtain a great brake torque. Thereafter, when canceling the holding action of maintaining the tilt rotation amount of the first hydraulic motor at zero, the tilt rotation amount of the first hydraulic motor is increased and the rotating speed of the drive shaft is decreased even when the tilt rotation amount of the second hydraulic motor is still maximum. Accordingly, since a speed change is basically performed by the tilt rotation amount of one of the first and second hydraulic motors, an accuracy of controlling the speed change can be improved.

In accordance with a seventh aspect of the invention, as defined by the first aspect, the apparatus, for controlling a plurality of hydraulic motors and a clutch, further comprises: clutch switching means, for switching the clutch between an engaged state and a disengaged state; hydraulic vehicle speed detecting means, for detecting a vehicle speed by a vehicle speed pressure signal, which is proportional to the vehicle speed; and control valve means. The control valve means inputs the vehicle speed pressure signal from the hydraulic vehicle speed detecting means, and outputs a pressure signal to the zero tilt rotation holding means that, at a time of increasing the speed of the vehicle, cancels the holding action for maintaining the tilt rotation amount of the first hydraulic motor at substantially zero in a state wherein the vehicle speed pressure signal is equal to or less than a first predetermined speed value and holds the tilt rotation amount of the first hydraulic motor at substantially zero in a state wherein the vehicle speed pressure signal is greater than the first predetermined speed value; and, at a time of decreasing the speed of the vehicle, holds the tilt rotation amount of the first hydraulic motor at substantially zero in a state wherein the vehicle speed pressure signal is greater than a second predetermined speed value, which is lower than the first predetermined speed value, and cancels the holding action for maintaining the tilt rotation amount of the first hydraulic motor at substantially zero in a state wherein the vehicle speed pressure signal is equal to or less than the second predetermined speed value. The control valve means also outputs a pressure signal to the clutch switching means that, at a time of increasing the speed of the vehicle, disengages the clutch after holding the tilt rotation amount of the first hydraulic motor at substantially zero, and, at a time of decreasing the speed of the vehicle, connects the clutch before canceling the holding action for maintaining the tilt rotation amount of the first hydraulic motor at substantially zero.

In accordance with the structure mentioned above, the first tilt rotation control means inputs the vehicle speed pressure signal from the hydraulic vehicle speed detecting means, holds the tilt rotation amount of the first hydraulic motor at substantially zero when the vehicle speed pressure signal is over the first predetermined speed value at a time of increasing the speed of the vehicle, and cancels the holding action for maintaining the tilt rotation amount of the first hydraulic motor at substantially zero when the vehicle speed pressure signal becomes equal to or less than the second predetermined speed value, which is lower than the first predetermined speed value, at a time of decreasing the speed of the vehicle. As mentioned above, a hunting of the control can be prevented by making the first predetermined speed value and the second predetermined speed value different from each other. Further, at a time of decreasing the speed of the vehicle, since the tilt rotation amount of the first hydraulic motor is held at zero until reaching a speed lower than that at a time of increasing the speed, the tilt rotation amount of the first hydraulic motor at a time of canceling the holding action becomes small at that degree, so that the brake torque is reduced.

Accordingly, in addition to the operation and effect of the fourth aspect, a speed reduction shock can be prevented even when improving an acceleration performance at a time of increasing the speed. Further, a hydraulic control can be performed in place of an electronic control, and the freedom for selecting a control apparatus is improved.

In accordance with an eighth aspect of the invention, as defined by the seventh aspect, the apparatus, for controlling a plurality of hydraulic motors and a clutch, further comprises: a second tilt rotation cylinder, for controlling a tilt rotation amount of the second hydraulic motor; a second servo valve, for outputting a control pressure to the second tilt rotation cylinder by receiving pressurized oil from the higher pressured one of a suction conduit and a discharge conduit of the second hydraulic motor; and a maximum tilt rotation holding valve, for controlling the second servo valve so that the second tilt rotation cylinder holds the tilt rotation amount of the second hydraulic motor at the maximum value; in which the control valve means outputs to the maximum tilt rotation holding valve a pressure signal which holds the tilt rotation amount of the second hydraulic motor to a maximum value when canceling the holding action for maintaining the tilt amount of the first hydraulic motor at substantially zero and cancels the holding action for maintaining the tilt rotation amount of the second hydraulic motor at the maximum value when holding the tilt rotation amount of the first hydraulic motor to substantially zero.

In accordance with the structure mentioned above, at a time of increasing the speed of the vehicle, since the holding action for maintaining the tilt rotation amount of the first hydraulic motor substantially zero is canceled even when the tilt rotation amount of the second hydraulic motor is still maximum, the tilt rotation amount of the first hydraulic motor is reduced, and the rotating speed of the drive shaft is increased. Next, since the holding action, for maintaining the tilt rotation amount of the second hydraulic motor at the maximum, is canceled even when the tilt rotation amount of the first hydraulic motor is held at substantially zero, the tilt rotation amount of the second hydraulic motor is decreased and the rotating speed of the drive shaft is increased. Further, at a time of decreasing the speed of the vehicle, since the tilt rotation amount of the first hydraulic motor is still zero but the tilt rotation amount of the second hydraulic motor becomes maximum due to the brake pressure, a great braking torque can be obtained and a responsiveness for changing speed can be improved. Next, since the holding action, for maintaining the tilt rotation amount of the first hydraulic motor at substantially zero, is canceled even when the tilt rotation amount of the second hydraulic motor is still maximum, the tilt rotation amount of the first hydraulic motor is increased and the rotating speed of the drive shaft is decreased.

Accordingly, since the speed change is basically performed by the tilt rotation amount of one of the first and second hydraulic motors, the accuracy for controlling the speed change is improved.

In accordance with a ninth aspect of the invention, as defined by the eighth aspect, the apparatus, for controlling a plurality of hydraulic motors and a clutch, further comprises: small tilt rotation holding means for holding the tilt rotation amount of the first hydraulic motor to a small tilt rotation amount, which is a predetermined amount greater than zero; and a small tilt rotation holding valve, for driving the small tilt rotation holding means; in which the control valve means outputs, to the maximum tilt rotation holding valve, a pressure signal for holding the tilt rotation amount of the second hydraulic motor to a maximum value when outputting, to the small tilt rotation holding valve, a pressure signal for holding the tilt rotation amount of the first hydraulic motor to a small tilt rotation amount.

In accordance with the structure mentioned above, the tilt rotation amount of the first hydraulic motor is held at the small tilt rotation amount (a small predetermined amount greater than zero), and the tilt rotation amount of the second hydraulic motor is held at its maximum. Accordingly, since the brake torque in the combination of the first and second hydraulic motors is great, an overtraveling of the vehicle can be prevented. Further, since the maximum tilt rotation holding valve is controlled by the pressure signal of the control valve means, rather than the case of setting an electromagnetic valve, a poor wiring connection, resulting from a connector generated by a vibration of the vehicle, does not occur, and the reliability is improved.

DETAILED DESCRIPTION OF THE PREFERRED EMBODIMENTS

Figure 1:
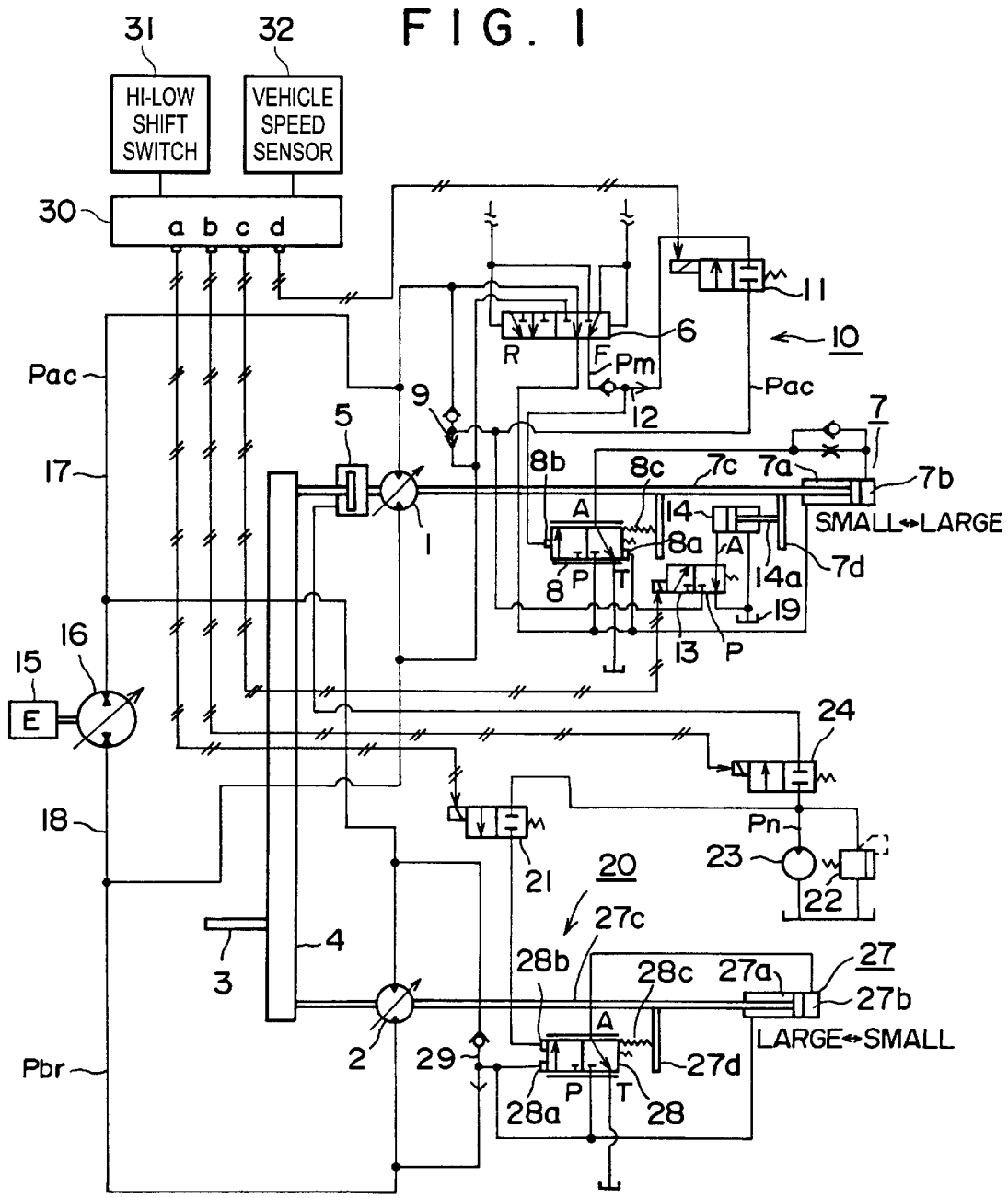
FIG. 1 is a control circuit diagram of a control apparatus for a plurality of hydraulic oil motors and a clutch in accordance with a first embodiment of the present invention.

An apparatus for controlling a plurality of hydraulic oil motors and a clutch in accordance with a first embodiment of the present invention will be described below with reference to FIGS. 1 to 3. A hydraulic oil pump 16, driven by an engine 15, is connected to the first volume variable hydraulic oil motor 1 and the second volume variable hydraulic oil motor 2 in parallel via the first main circuit 17 and the second main circuit 18. An output shaft of the second hydraulic motor 2 is always connected via the reduction gear 4 to the drive shaft 3 for driving a wheel of a vehicle (not shown). An output shaft of the first hydraulic motor 1 is connected to the drive shaft 3 via the clutch 5 and the reduction gear 4.

A drive side pressurized oil (hereinafter, referred to as a pressurized oil), Pac of the first main circuit 17 or Pbr of the second main circuit 18, is connected via the FR switching valve 6 to the rod chamber 7a of the first tilt rotation cylinder 7, for controlling the tilt rotation amount of the first hydraulic motor 1, to the first pilot pressure receiving portion 8a of the first servo valve 8, and to the P port of the first servo valve 8. The FR switching valve 6 is switched by an oil pressure from the forward and rearward movement operating valve (hereinafter, referred to as the FR operating valve, not shown). Further, an A port of the first servo valve 8 is connected to the bottom chamber 7b of the first tilt rotation cylinder 7.

A vehicle speed control includes two kinds of modes, that is, a Hi mode and a Lo mode. When the zero tilt rotation holding valve 11, for limiting an allowable rotating speed in the Hi mode, is at its closed position, as shown in FIG. 1, the variable control pressure Pm, which is proportional to the engine rotating speed and is supplied from the FR switching valve 6, is supplied via the shuttle valve 12 to the second pilot pressure receiving portion 8b of the first servo valve 8. The first servo valve 8 supplies a pressurized oil, reduced between the P port and the A port of the first servo valve 8, to the bottom chamber 7b of the first tilt rotation cylinder 7 in response to a position at which an urging force due to the variable control pressure Pm at the second pilot pressure receiving portion 8b, an urging force due to the pressurized oil Pac or Pbr at the first pilot pressure receiving portion 8a, and the spring force of the spring 8c are balanced, thereby controlling the tilt rotation amount of the first hydraulic motor 1.

A high pressure oil, of the first main circuit 17 or the second main circuit 18 and supplied through the shuttle valve 9, is supplied to the P port of the small tilt rotation holding valve 13 for limiting the allowable rotating speed in the Lo mode. The A port of the small tilt rotation holding valve 13 is connected to the bottom chamber of the stopper cylinder 14, and the rod chamber of the stopper cylinder 14 is connected to the tank 19.

When the small tilt rotation holding valve 13 is in its first position, it provides communication between its P port and its A port, and the piston rod 14a of the stopper cylinder 14 moves to its extended position and stops, so that the small tilt rotation amount position of the first hydraulic motor 1 is set. Further, when the small tilt rotation holding valve 13 is at its second position, as shown in FIG. 1, each of the rod chamber and the bottom chamber of the stopper cylinder 14 is connected to the tank 19 so as to drain oil from the chambers of the stopper cylinder 14, so that the stopper cylinder 14 is in a floating condition wherein the piston rod 14a can move to its contracted position and the zero tilt rotation amount position of the first hydraulic motor 1 can be set. As mentioned above, in the state that the small tilt rotation holding valve 13 is in its first position, providing communication between its P port and its A port, the tilt rotation amount of the first hydraulic motor 1 can be reduced to the small tilt rotation amount position corresponding to the Lo mode. Further, in a state wherein the small tilt rotation holding valve 13 is at its second position, closing communication between its P port and its A port, the tilt rotation amount of the first hydraulic motor 1 can be reduced to substantially the zero tilt rotation amount position corresponding to the Hi mode.

In this case, when the zero tilt rotation holding valve 11 is in its communication position, a high pressure oil of the first main circuit 17 or the second main circuit 18, having a pressure greater than the variable control pressure Pm and being supplied via the shuttle valve 9 and the communication position of the zero tilt rotation holding valve 11, is supplied via the shuttle valve 12 to the second pilot pressure receiving portion 8b of the first servo valve 8, rather than the variable control pressure Pm, so that the first servo valve 8 moves to its maximum position, wherein its P port communicates with its A port. Accordingly, the piston rod 7c of the first tilt rotation cylinder 7 is moved leftwardly (with reference to the drawings) by the pressurized oil supplied from the first servo valve 8 to the bottom chamber 7b of the first tilt rotation cylinder 7. Then, the stopper 7d, which is connected to the piston rod 7c, is brought into contact with the piston rod 14a of the stopper cylinder 14 at the small tilt rotation amount position or the substantially zero tilt rotation amount position of the first hydraulic motor 1, set by the piston rod 14a of the stopper cylinder 14, and is held at the small tilt rotation amount position or the substantially zero tilt rotation amount position of the first hydraulic motor 1. As mentioned above, the zero tilt rotation holding means 10, for holding the tilt rotation amount of the first hydraulic motor 1, is constituted by the zero tilt rotation holding valve 11, the first servo valve 8, the first tilt rotation cylinder 7, the stopper 7d of the first tilt rotation cylinder 7, the small tilt rotation holding valve 13, and the stopper cylinder 14.

On the other hand, a high pressure oil, of the first main circuit 17 or the second main circuit 18 and supplied via the shuttle valve 29, is supplied to the rod chamber 27a of the second tilt rotation cylinder 27 for controlling the tilt rotation amount of the second hydraulic motor 2, to the pilot pressure receiving portion 28a of the second servo valve 28, and to the P port of the second servo valve 28. Further, an A port of the second servo valve 28 is connected to the bottom chamber 27b of the second tilt rotation cylinder 27.

A discharge port of the control pump 23, for discharging the control pressure Pn which is controlled to a fixed pressure by the relief valve 22, is connected to the clutch 5 via the clutch switching valve 24 and is connected to the second pilot pressure receiving portion 28b of the second servo valve 28 via the maximum tilt rotation holding valve 21. When the clutch switching valve 24 is at its closed position, as shown in FIG. 1, the fixed control pressure Pn is not supplied to the clutch 5, so that the clutch 5, in the engaged condition due to the bias of a spring (not shown), transmits the power of the first hydraulic motor 1 to the drive shaft 3. On the other hand, when the clutch switching valve 24 is in its communication position, the fixed control pressure Pn is supplied to the clutch 5, so that the clutch 5 is disengaged, and the power of the first hydraulic motor 1 is not transmitted to the drive shaft 3.

When the maximum tilt rotation holding valve 21 is at its closed position, as shown in FIG. 1, the fixed control pressure Pn is not supplied to the second pilot pressure receiving portion 28b of the second servo valve 28, so that the spool of the second servo valve 28 moves to a position at which the urging force due to the high pressure oil in the first pilot pressure receiving portion 28a of the second servo valve 28 and the spring force of the spring 28c are balanced. A pressurized oil, reduced between the P port and the A port of the second servo valve 28, is supplied to the bottom chamber 27b of the second tilt rotation cylinder 27 in response to the spool position of the second servo valve 28, so that the tilt rotation amount of the second hydraulic motor 2 is set. On the other hand, when the maximum tilt rotation holding valve 21 is in its communicating position, the P port and the A port in the maximum tilt rotation holding valve 21 are in communication with each other, so that the fixed control pressure Pn is supplied from the control pump 23 to the second pilot pressure receiving portion 28b of the second servo valve 28, and the second servo valve 28 moves to its maximum position. Accordingly, the high pressure oil is supplied to the bottom chamber 27b of the second tilt rotation cylinder 27, and the second hydraulic motor 2 is set and held at the maximum tilt rotation amount. As mentioned above, the maximum tilt rotation holding means 20 for holding the tilt rotation amount (a discharge volume) of the second hydraulic motor 2 is constituted by the maximum tilt rotation holding valve 21, the second servo valve 28, and the second tilt rotation cylinder 27.

When a Hi-Lo shift signal, from the Hi-Lo shift switch 31 which is operated by an operator, and a vehicle speed signal, from the vehicle speed sensor 32, are inputted, the controller 30 calculates, for example, an ON-OFF signal for outputting to the solenoid of the small tilt rotation holding valve 13. More particularly, the controller 30 has the terminal a, which is connected to the solenoid of the maximum tilt rotation holding valve 21; the terminal b, which is connected to the solenoid of the clutch switching valve 24; the terminal c, which is connected to the solenoid of the small tilt rotation holding valve 13; and the terminal d, which is connected to the solenoid of the zero tilt rotation holding valve 11, as shown in FIG. 1. The controller 30 calculates the various ON-OFF signals for the terminals a, b, c, and d with respect to the vehicle speed and the output of the Hi-Lo shift switch.

Figures 2A, 2B:
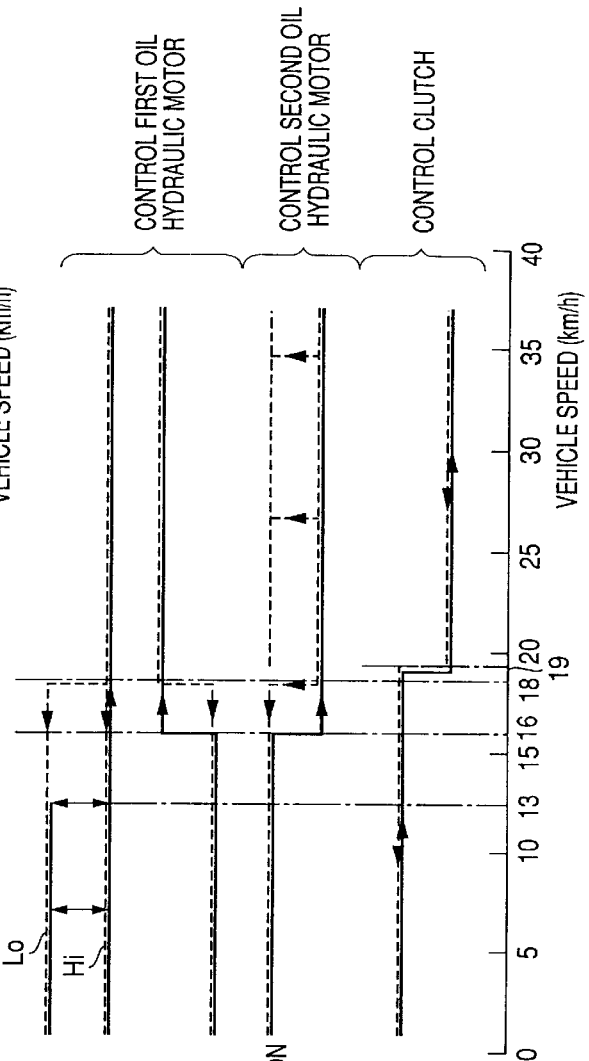
FIG. 2A is a graph which shows a relation between the tilt rotation amount (the motor discharge volume) and the vehicle speed in each of the hydraulic oil motors shown in FIG. 1.
FIG. 2B is a diagram which shows a relation between the vehicle speed and the operating state for each of four valves.

In FIG. 2A, the horizontal axis corresponds to the vehicle speed, and the vertical axis corresponds to the tilt rotation amount of the first and second hydraulic motors 1 and 2, expressed as a discharge volume (cc/rev). FIG. 2A shows the relation between the vehicle speed at a time of fully operating an accelerator from a stopped state of the vehicle and the tilt rotation amount of the first and second hydraulic motors 1 and 2, and does not relate to the load of the first and second hydraulic motors 1 and 2. Accordingly, the tilt rotation amounts move in parallel to the direction of an arrow Q at a time of a partial operation of the engine 15. FIG. 2B shows the relation between the vehicle speed in FIG. 2A and the ON and OFF conditions of the solenoid in the small tilt rotation holding valve 13 and the like. In both drawings, a speed increase is shown by a solid line and a speed reduction is shown by a broken line.

In FIG. 2B, when the Hi shift signal is inputted to the controller 30, the small tilt rotation holding valve 13 is set to OFF without relation to the vehicle speed in the case of the speed increase as well as in the case of the speed reduction. Further, at a time of increasing the speed, it is possible to freely switch to ON (a small tilt rotation) in accordance with the Hi shift signal and OFF (a zero tilt rotation) in accordance with the Lo shift signal until the vehicle speed is about 13 km/h. On the other hand, at a time of reducing the speed, in the case of switching from the Hi shift signal to the Lo shift signal when the vehicle speed is equal to or greater than about 18 km/h, the solenoid automatically switches from OFF to ON when the vehicle speed is equal to or less than about 18 km/h.

The zero tilt rotation holding valve 11 is OFF until the vehicle speed is increased to about 16 km/h at a time of increasing the speed, and turns to ON when the vehicle speed is over about 16 km/h (a first predetermined speed). On the other hand, at a time of reducing the vehicle speed, the zero tilt rotation holding valve 11 is ON until the vehicle speed is reduced to about 18 km/h (a second predetermined speed), and turns to OFF when the vehicle speed is equal to or less than about 18 km/h.

At a time of increasing the vehicle speed, the maximum tilt rotation holding valve 21 is ON until the vehicle speed is increased to about 16 km/h, and turns OFF when the vehicle speed is over about 16 km/h. On the other hand, at a time of reducing the vehicle speed, the maximum tilt rotation holding valve automatically turns to ON when the vehicle speed is reduced to about 18 km/h; however, even for a vehicle speed over about 18 km/h, when turning from the Hi shift signal to the Lo shift signal, the maximum tilt rotation holding valve 21 immediately turns to ON.

In both cases of increasing or reducing the vehicle speed, the clutch switching valve 24 is ON when the vehicle speed is below about 19 km/h, and is OFF when the vehicle speed is over about 19 km/h.

Next, an operation of the first embodiment will be described below.

(1.1) Operation when the vehicle speed is increasing and the vehicle speed shown in FIGS. 2A and 2B is in a low speed range equal to or less than 16 km/h When the Hi shift signal and the vehicle speed signal are inputted to the controller 30, as shown in FIG. 2B, the small tilt rotation holding valve 13 becomes OFF by the Hi shift signal, and further, due to the low speed range, the zero tilt rotation holding valve 11 is OFF, the maximum tilt rotation holding valve 21 is ON, and the clutch switching valve 24 is ON.

When the vehicle begins to be driven at a time of forward moving (F), the pressurized oil Pac in the first main circuit 17, becomes a high pressure oil, and is supplied to the rod chamber 7a of the first tilt rotation cylinder 7, to the first pilot pressure receiving portion 8a of the first servo valve 8, and to the P port of the first servo valve 8 via the F position of the FR switching valve 6. Further, the variable control pressure Pm, which is proportional to the engine rotating speed as controlled by an acceleration pedal (not shown) and the like, is supplied to the second pilot pressure receiving portion 8b of the first servo valve 8 through the F position of the FR switching valve 6 and the shuttle valve 12. The first servo valve 8 is controlled to a position at which the variable control pressure Pm, the urging force by the pressurized oil Pac, and the spring 8c are balanced. Since the relation Pm<<Pac is established when the vehicle is begun to be driven, the opening (hereinafter, referred to as a first opening) for communicating the P port with the A port in the first servo valve 8 becomes small. Accordingly, since the pressure reduction amount of the pressurized oil Pac in the P port becomes large and the oil pressure supplied to the bottom chamber 7b of the first tilt rotation cylinder 7 is low, the first hydraulic motor 1 becomes the maximum tilt rotation amount. In this case, since the maximum tilt rotation holding valve 21 is ON (communication), the fixed control pressure Pn of the control pump 23 acts on the second pilot pressure receiving portion 28b of the second servo valve 28. Accordingly, the opening (hereinafter, referred to as a second opening) for communicating the P port with the A port in the second servo valve 28 becomes large. Accordingly, since the pressurized oil Pac in the P port of the second servo valve 28 is not reduced and the oil pressure supplied to the bottom chamber 27b of the second tilt rotation cylinder 27 is high, the second hydraulic motor 2 is held at the maximum tilt rotation amount. As mentioned above, the vehicle begins to start at the maximum torque provided by the maximum tilt rotation amounts of the first and second hydraulic motors 1 and 2.

At an initial time of beginning the start, a great portion of the pressurized oil is relieved by a relief valve (not shown) for limiting the maximum pressure of the pressurized oil Pac; however, the relieved flow amount is gradually reduced and the flow amount supplied to the first and second hydraulic motors 1 and 2 is increased. Accordingly, as shown in FIG. 2A, the speed is increased until about 4 km/h even when the tilt rotation amount of each of the first and second hydraulic motors 1 and 2 is constant. Thereafter, since the drive torque of the vehicle is gradually reduced, the pressure of the oil Pac is lowered, the variable control pressure Pm satisfies the relation Pm>Pac, and the first opening of the first servo valve 8 becomes large, and the oil pressure supplied to the bottom chamber 7b of the first tilt rotation cylinder 7 from the A port of the first servo valve 8 becomes high. On the other hand, the pressurized oil Pac is also supplied to the rod chamber 7a of the first tilt rotation cylinder 7; however, since the pressure receiving area is small, it is a low force on the piston rod of the first tilt rotation cylinder 7. Accordingly, the piston rod 7c moves in the leftward direction (with reference to the drawings) so as to reduce the tilt rotation amount (the discharge volume) of the first hydraulic motor 1. When the vehicle speed is increased to about 16 km/h after continuing this state, the tilt rotation amount of the first hydraulic motor 1 becomes substantially zero. At this time, since the stopper cylinder 14 is in the floating state, the tilt rotation amount of the first hydraulic motor 1 is continuously reduced to substantially zero even when the stopper 7d is brought into contact with the piston rod 14a.

(1.2) Operation when the vehicle speed is increasing and the vehicle speed shown in FIGS. 2A and 2B is in a high speed range over 16 km/h The small tilt rotation holding valve 13 is still OFF (drain) by the Hi shift signal. Due to the high speed range, the zero tilt rotation holding valve 11 was switched to ON (communication) and the maximum tilt rotation holding valve 21 was switched to OFF (shut) when the vehicle speed reached 16 km/h.

The high pressure oil, supplied via the zero tilt rotation holding valve 11 to the second pilot pressure receiving portion 8b of the first servo valve 8, overcomes the pressurized oil Pac at the first pilot pressure receiving portion 8a and the urging force by the spring 8c, and controls until the first opening of the first servo valve 8 becomes maximum. The pressurized oil Pac is supplied from the A port of the first servo valve 8 to the bottom chamber 7b of the first tilt rotation cylinder 7 and is also directly supplied to the rod chamber 7a; however, the piston rod 7c moves in the leftward direction (with reference to the drawings) due to the difference between the pressure receiving area of the rod chamber 7a and the pressure receiving area of the bottom chamber 7b. At this time, since the small tilt rotation holding valve 13 is still OFF, the piston rod 14a of the stopper cylinder 14 is contracted, and the stopper 7d, which is fixed to the piston rod 7c of the first tilt rotation cylinder 7, moves until it makes contact with the piston rod 14a. Accordingly, the tilt rotation amount of the first hydraulic motor 1 is reduced to substantially zero, and is held at the substantially zero position. Thereafter, when the vehicle speed reaches about 19 km/h, the clutch switching valve 24 turns to OFF (shut), and the first hydraulic motor 1 is disconnected from the drive shaft 3.

Further, since the maximum tilt rotation holding valve 21 turns to OFF, the fixed control pressure Pn of the control pump 23 does not act on the second pilot pressure receiving portion 28b of the second servo valve 28. Accordingly, the second opening of the second servo valve 28 is reduced, and the oil pressure in the bottom chamber 27b of the second tilt rotation cylinder 27 is lowered. Therefore, the piston rod 27c of the second tilt rotation cylinder 27 moves in the rightward direction (with reference to the drawings); and the holding action, for maintaining the tilt rotation amount of the second hydraulic motor 2 at maximum, is cancelled.

(1.3) Operation when the vehicle speed is reducing and the vehicle speed shown in FIGS. 2A and 2B is in a high speed range over 16 km/h In the same manner as with the operation in the high speed range at the time of increasing the speed, the small tilt rotation holding valve 13 is still OFF (drain), the zero tilt rotation holding valve 11 is still ON (communication), the maximum tilt rotation holding valve 21 is still OFF (closed), and the clutch switching valve 24 is still OFF (closed).

Accordingly, since the tilt rotation amount of the first hydraulic motor 1 is held at substantially zero; but the holding action, for maintaining the tilt rotation amount of the second hydraulic motor 2 at its maximum, is cancelled; the high pressure oil of the main circuit 28, increased by the speed reduction, acts on the first pilot pressure receiving portion 28a of the second servo valve 28 via the shuttle valve 29 so as to maximize the opening of the second servo valve 28. Accordingly, the oil pressure in the bottom chamber 27b of the second tilt rotation cylinder 27 becomes high, and the tilt rotation amount of the second hydraulic motor 2 becomes maximum, as shown by a broken line in FIG. 2A. When the vehicle speed is reduced to about 19 km/h by the maximum brake torque, at first the clutch switching valve 24 turns to ON, as shown by a broken line in FIG. 2B, and the small tilt rotation holding valve 13 is maintained OFF. Next, when the vehicle speed becomes about 18 km/h, the zero tilt rotation holding valve 11 turns to OFF and the maximum tilt rotation holding valve 21 turns to ON. Therefore, the clutch 5 is connected; and thereafter the holding action, for maintaining the tilt rotation amount of the first hydraulic motor 1 substantially zero, is cancelled.

(1.4) Operation when the vehicle speed is reducing and the vehicle speed shown in FIGS. 2A and 2B is in a low speed range equal to or less than 16 km/h Since the pressure of the oil Pac begins to increase together with the reduction of the vehicle speed after cancelling the holding action for maintaining the tilt rotation amount of the first hydraulic motor 1 substantially zero, the tilt rotation amount of the first hydraulic motor 1 is increased from the minimum to the maximum. As mentioned above, the tilt rotation amount of the second hydraulic motor 2 is held at the maximum as well as the tilt rotation amount of the first hydraulic motor 1 is held at the small tilt rotation amount, which is a predetermined small amount larger than zero. Accordingly, since the brake torque obtained by adding the first hydraulic motor 1 to the second hydraulic motor 2 is great, an overtraveling of the vehicle can be prevented. When the vehicle speed is further reduced to 4 km/h or less, the tilt rotation amount of the first hydraulic motor 1 becomes maximum; however, the oil amount relieved via a relief valve in a main circuit (not shown) is increased, so that the vehicle speed is further reduced.

Figure 3:
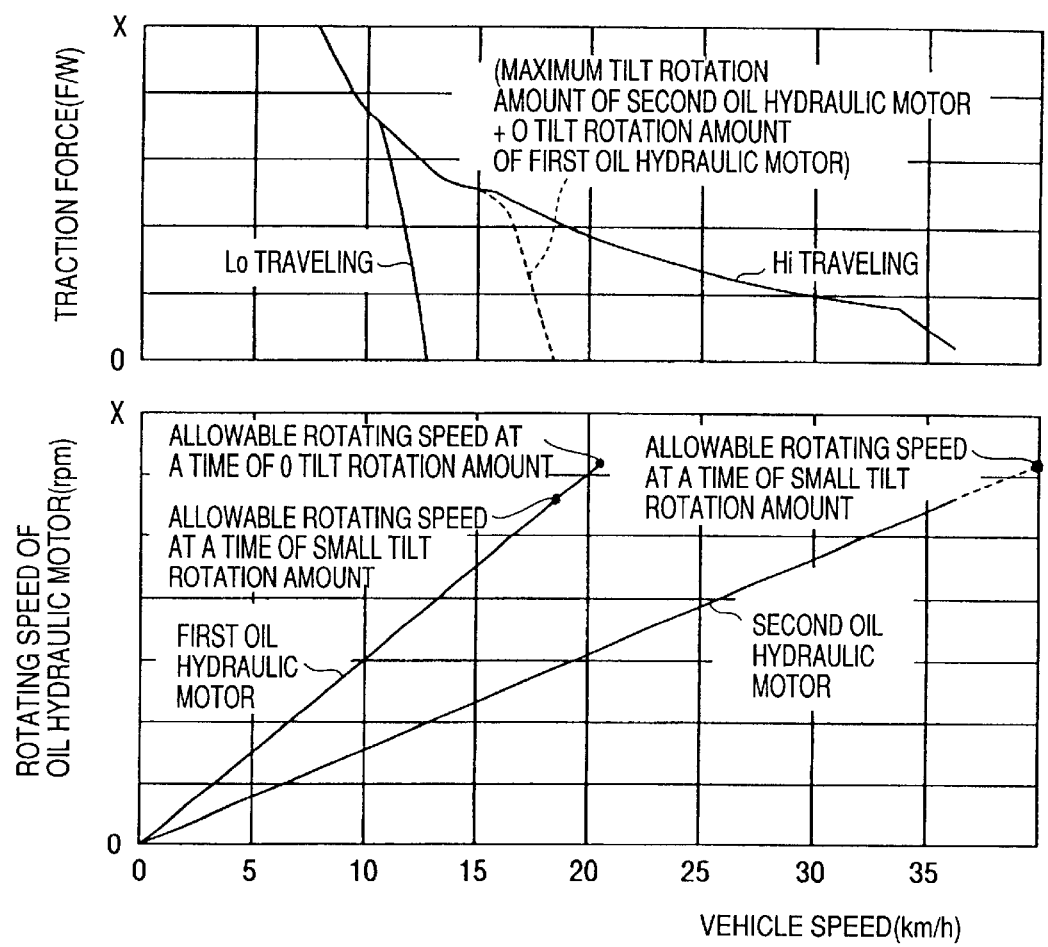
FIG. 3 is a graph which shows a relation between the rotating speed, the traction force, and the vehicle speed for each of the hydraulic oil motors shown in FIG. 1.

A relation between the vehicle speed and each of the rotating speeds of the first and second hydraulic motors 1 and 2, and the traction force is shown in FIG. 3. In this case, the vehicle speed V in the horizontal axis is expressed by the same scale as the vehicle speed shown in FIGS. 2A and 2B. The respective rotating speeds of the first and second hydraulic motors 1 and 2 are combined so that both become the same rotating speed, which is outputted to the drive shaft 3. Further, an allowable rotating speed at a time of the zero tilt rotation amount corresponds to an allowable rotating speed at a time of the Hi mode, and an allowable rotating speed at a time of the small tilt rotation amount corresponds to an allowable rotating speed at a time of the Lo mode.

Here, in FIG. 1, the first and second main circuits 17 and 18, for connecting the hydraulic pump 16 to the first and second hydraulic motors 1 and 2, are shown as closed circuits; however, they are not limited to closed circuits as the present invention is similarly established in the case of open circuits.

Figure 4:
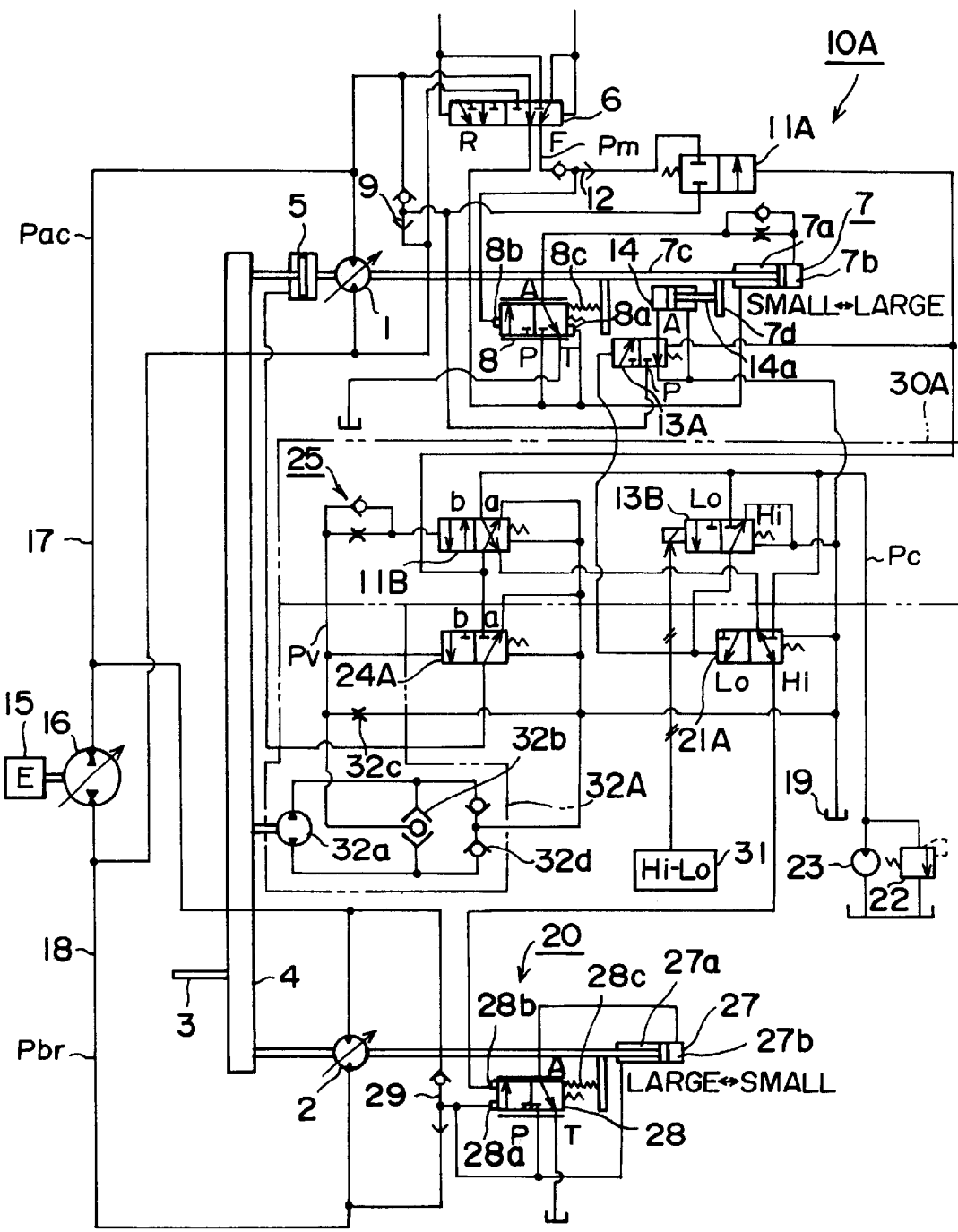
FIG. 4 is a control circuit diagram in a Hi mode for a control apparatus for a plurality of hydraulic oil motors and a clutch in accordance with a second embodiment of the present invention.
Figure 5:
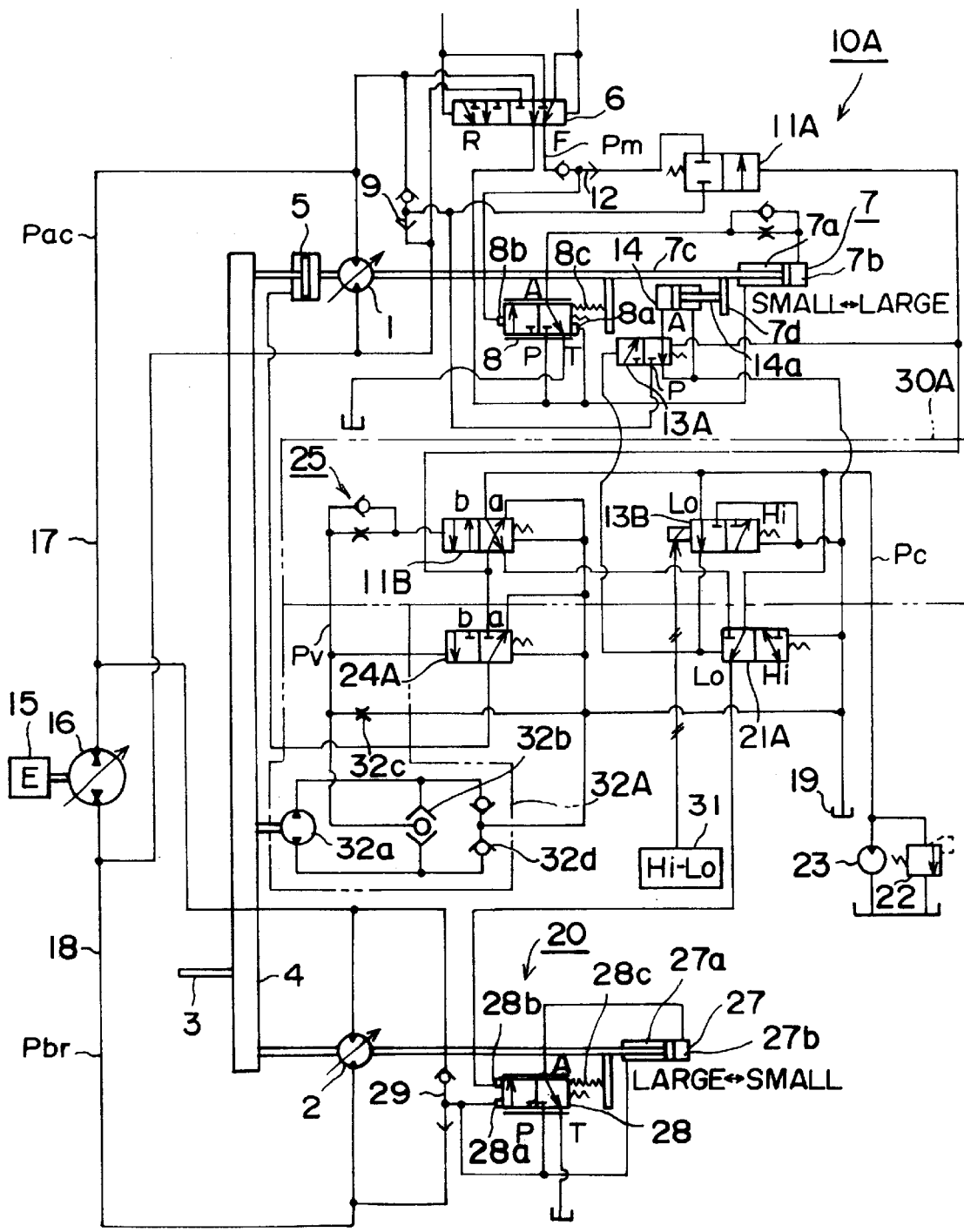
FIG. 5 is the control circuit diagram of FIG. 4 in a Lo mode.

Next, a second embodiment in accordance with the present invention will be described below with reference to FIGS. 4 to 6B. In FIGS. 4 and 5, showing the control circuit of the second embodiment, the zero tilt rotation holding valve 11, the zero tilt rotation holding means 10, the small tilt rotation holding valve 13, the maximum tilt rotation holding valve 21, the clutch switching valve 24, the controller 30, and the vehicle speed sensor 32, shown in FIG. 1 in accordance with the first embodiment, are respectively replaced by the zero tilt rotation holding valve 11A, the zero tilt rotation holding means 10A, the small tilt rotation holding valve 13A, the maximum tilt rotation holding valve 21A, the clutch switching valve 24A, the control valve means 30A, and the hydraulic vehicle speed detecting means 32A. Since the other structures are the same as those of the first embodiment, the same reference numerals are attached thereto and an explanation thereof will be omitted. Since FIG. 6A is the same as FIG. 2A in the first embodiment, an explanation will be omitted.

Figures 6A, 6B:
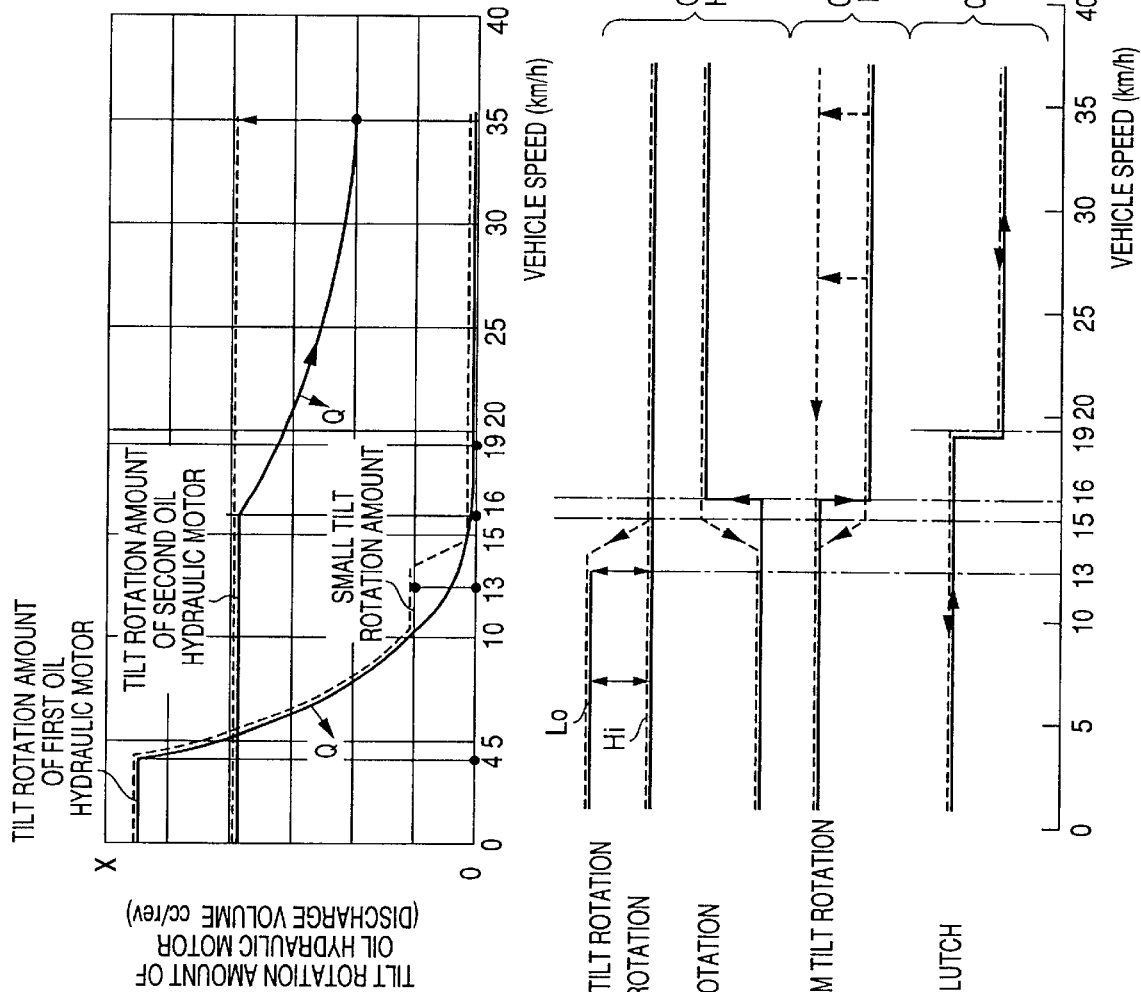
FIG. 6A is a graph which shows a relation between the vehicle speed and the tilt rotation amount (the motor discharge volume) for each of the hydraulic oil motors shown in FIG. 4.
FIG. 6B is a diagram which shows a relation between the vehicle speed and the operating state for each of four valves.
Figure 7:
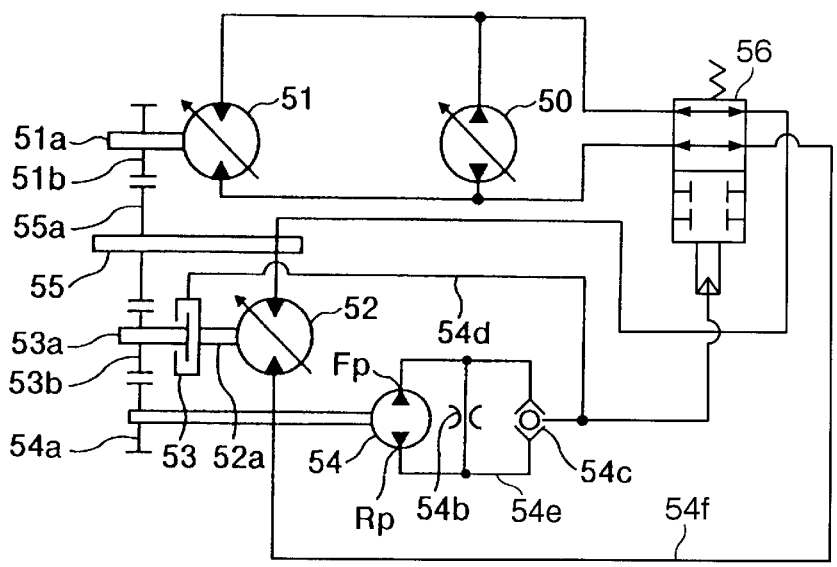
FIG. 7 is a control circuit diagram of a conventional control apparatus for a plurality of hydraulic oil motors and a clutch.
Figure 8:
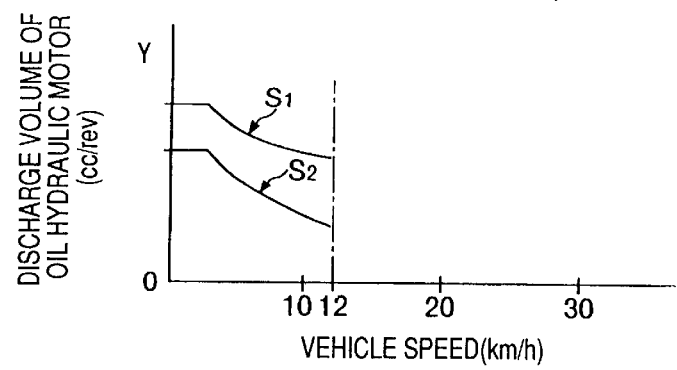
FIG. 8 is a graph which shows a relation between the vehicle speed and the motor discharge volume in a Lo mode of the hydraulic motor shown in FIG. 7.
Figure 9:
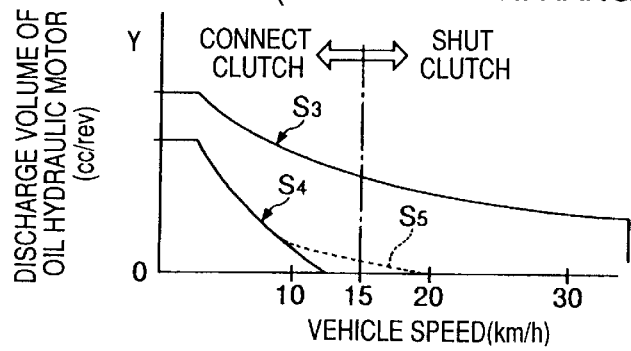
FIG. 9 is a graph which shows a relation between the vehicle speed and the motor discharge volume in a Hi mode of the hydraulic motor shown in FIG. 7.

FIG. 6B shows the operational relation between the vehicle speed shown in FIG. 6A and each of the small tilt rotation holding valve 13A, the zero tilt rotation holding valve 11A, the tilt rotation holding control valve 11B, and the clutch switching valve 24A, in which a speed increase is shown by a solid line and a speed reduction is shown by a broken line.

The hydraulic vehicle speed detecting means 32A is provided with the vehicle speed detecting pump 32a, which is driven by the reduction gear 4; the high pressure selecting valve 32b, for selecting the vehicle speed pressure signal Pv which the vehicle speed detecting pump 32a discharges in response to the direction of rotation of the vehicle speed detecting pump 32a; the throttle 32c, which is interposed in the conduit connecting the high pressure selecting valve 32b to the tank 19; and the suction valve 32d, for sucking oil from the tank 19 to the vehicle speed detecting pump 32a. The hydraulic vehicle speed detecting means 32A detects the vehicle speed by the vehicle speed pressure signal Pv (which is proportional to the vehicle speed) generated at a time when the discharge oil of the vehicle speed detecting pump 32a is drained through the hydraulic selecting valve 32b and the throttle 32c.

The control valve means 30A is provided with the tilt rotation holding control valve 11B, the Hi-Lo switching electromagnetic valve 13B, and the slow return valve 25. The tilt rotation holding control valve 11B is at its position a while the vehicle speed is less than 16 km/h, and is at its position b when the vehicle speed is equal to or greater than 16 km/h, by using the vehicle speed pressure signal Pv, which is supplied through the slow return valve 25 as a pilot pressure. Then, at a time of increasing the vehicle speed, the tilt rotation holding control valve 11B is immediately switched to its position b when the vehicle speed reaches 16 km/h, and at a time of reducing the speed the tilt rotation holding control valve 11B is gradually switched to its position a by the slow return valve 25 after the vehicle speed is reduced to 16 km/h.

When the tilt rotation holding control valve 11B is in its position a, the discharge port of the control pump 23 is connected to the inlet port of the maximum tilt rotation holding valve 21A; and the floating side pilot pressure receiving portion of the small tilt rotation holding valve 13A and the pilot pressure receiving portion of the zero tilt rotation holding valve 11A are connected to the tank 19. On the other hand, when the tilt rotation holding control valve 11B is at its position b, the discharge port of the control pump 23 is connected to each of the inlet port of the clutch switching valve 24A, the floating side pilot pressure receiving portion of the small tilt rotation holding valve 13A, and the pilot pressure receiving portion of the zero tilt rotation holding valve 11A; and the inlet port of the maximum tilt rotation holding valve 21A is connected to the tank 19.

The Hi-Lo switching electromagnetic valve 13B is in its Hi position when the solenoid is demagnetized by the Hi-Lo shift switch 31, and is in its Lo position when the solenoid is being magnetized. At the Hi position, shown in FIG. 4, an extension side pilot pressure receiving portion of the small tilt rotation holding valve 13A and the pilot pressure receiving portion of the maximum tilt rotation holding valve 21A are connected to the tank 19. On the other hand, when the Hi-Lo switching valve 13B is in its Lo position, the discharge port of the control pump 23 is connected to the extension side pilot pressure receiving portion of the small tilt rotation holding valve 13A and to the pilot pressure receiving portion of the maximum tilt rotation holding valve 21A. In this case, the clutch switching valve 24A is in its position a when the vehicle speed is equal to or less than 19 km/h and is in its position b when the vehicle speed is over 19 km/h, as shown in FIG. 6B, and the outlet port thereof is connected to the clutch 5.

The outlet port of the maximum tilt rotation holding valve 21A is connected to the second pilot pressure receiving portion 28b of the second servo valve 28.

Next, an operation of the second embodiment will be described below.

(2.1) Operation when the vehicle speed is increasing and the vehicle speed shown in FIGS. 6A and 6B is in a low speed range and is equal to or less than 16 km/h When the solenoid of the Hi-Lo electromagnetic switching valve 13B is demagnetized, the Hi-Lo electromagnetic switching valve 13B is in its Hi position, as shown in FIG. 4, so that the pressurized oil in the extension side pilot pressure receiving portion of the small tilt rotation holding valve 13A and the pressurized oil in the pilot pressure receiving portion of the maximum tilt rotation holding valve 21A are drained. Further, since the vehicle speed pressure signal Pv is a low pressure, the tilt rotation holding control valve 11B and the clutch switching valve 24A are both at their position a. Accordingly, the pressurized oil in the floating side pilot pressure receiving portion of the small tilt rotation holding valve 13A and the pressurized oil in the pilot pressure receiving portion of the zero tilt rotation holding valve 11A are drained. Therefore, the zero tilt rotation holding valve 11A is in its closed position and the small tilt rotation holding valve 13A is switched to its floating position due to the spring force, thereby making the stopper cylinder 14 be in the floating state. Further, since the clutch pressurized oil is drained through the position a of the clutch switching valve 24A, the clutch 5 is engaged. Still further, the fixed control pressure Pc is supplied to the second pilot pressure receiving portion 28b of the second servo valve 28 via the position a of the tilt rotation holding control valve 11B and the Hi position of the maximum tilt rotation holding valve 21A, and the spool of the second servo valve 28 is moved to provide an opening for communication between the P port and the A port of the second servo valve 28.

In this case, when the vehicle begins to be driven at a time of forward moving (F), the pressurized oil Pac, which becomes a high pressure in the first main circuit 17, is supplied via the F position of the FR switching valve 6 to the rod chamber 7a of the first tilt rotation cylinder 7, to the first pilot pressure receiving portion 8a of the first servo valve 8, and to the P port of the first servo valve 8. Further, the variable control pressure Pm, which is proportional to the engine rotating speed as controlled by an acceleration pedal (not shown) and the like, is supplied via the F position of the FR switching valve 6 and the shuttle valve 12 to the second pilot pressure receiving portion 8b of the first servo valve 8. The first servo valve 8 is controlled to a position at which the variable control pressure Pm at the second pilot pressure receiving portion 8b, the urging force of the pressurized oil Pac at the first pilot pressure receiving portion 8a, and the spring 8c are balanced. Since the relation Pm<<Pac is established when the driving of the vehicle is initiated, the first opening, for communicating the P port with the A port in the first servo valve 8, becomes small. Accordingly, since the pressurized oil Pac in the P port is reduced and the oil pressure supplied to the bottom chamber 7b of the first tilt rotation cylinder 7 is low, the tilt rotation amount of the first hydraulic motor 1 becomes maximum as shown in FIG. 6A. On the other hand, since the second opening in the second servo valve 28 is increased, the pressurized oil Pac in the P port is not reduced and is supplied to the bottom chamber 27b of the second tilt rotation cylinder 27. Accordingly, the tilt rotation amount in the second hydraulic motor 2 is held at the maximum amount, as shown in FIG. 6A. Since the first and second hydraulic motors 1 and 2 both have the maximum tilt rotation amount, the vehicle begins to start at the maximum torque. In this case, when the fixed control pressure Pc is set to be larger than the maximum value of the variable control pressure Pm, it is possible to omit the zero tilt rotation holding valve 11A and directly connect the outlet port of the tilt rotation holding control valve 11B to the shuttle valve 12.

At the time of initiation of the traveling of the vehicle, a great portion of the pressurized oil is relieved by a relief valve (not shown), for limiting the maximum pressure of the pressurized oil Pac; however, the relieved flow amount is gradually reduced and the flow amount supplied to the first and second hydraulic motors 1 and 2 is increased. Accordingly, as shown in FIG. 6A, the vehicle speed is increased to about 4 km/h, even when the tilt rotation amount of the first and second hydraulic motors 1 and 2 is constant. Thereafter, since the drive torque of the vehicle is gradually reduced, the pressure of the oil Pac is lowered, the variable control pressure Pm satisfies the relation Pm>Pac, and the first opening of the first servo valve 8 becomes large, the oil pressure supplied to the bottom chamber 7b of the first tilt rotation cylinder 7 from the A port becomes high. Accordingly, the pressurized oil Pac is also supplied to the rod chamber 7a of the first tilt rotation cylinder 7; however, the piston rod 7c moves in the leftward direction (with reference to the drawings) due to the difference in pressure receiving areas so as to reduce the tilt rotation amount (the discharge volume) of the first hydraulic motor 1. At this time, since the stopper cylinder 14 is in the floating state, the tilt rotation amount of the first hydraulic motor 1 is continuously reduced to substantially zero even when the stopper 7d is brought into contact with the piston rod 14a. Then, the control valve means 30A fixes the tilt rotation amount of the first hydraulic motor 1 to be substantially zero when the vehicle speed pressure signal Pv, supplied through the slow return valve 25, represents 16 km/h as shown in FIG. 6A.

In this case, when the Hi-Lo switch 31 in its Lo mode before the tilt rotation amount of the first hydraulic motor 1 reaches the small tilt rotation amount, which is greater than zero, the solenoid of the Hi-Lo switching electromagnetic valve 13B is magnetized so as to switch the Hi-Lo switching electromagnetic valve 13B to its Lo position, as shown in FIG. 5. Accordingly, the fixed control pressure Pc is supplied to the extension side pilot pressure receiving portion of the small tilt rotation holding valve 13A and to the pilot pressure receiving portion of the maximum tilt rotation holding valve 21A; the small tilt rotation holding valve 13A is switched to its extension position, and the piston rod 14a is extended. However, upon contact of the piston rod 14a with the stopper 7d, the small tilt rotation amount of the first hydraulic motor 1 becomes restricted, and the tilt rotation amount of the first hydraulic motor 1 is reduced to and held at the small tilt rotation amount, as shown in FIG. 6A. Accordingly, in comparison with the Hi mode, the Lo mode provides a low speed and a high torque at the degree of the small tilt rotation amount of the first hydraulic motor 1.

Further, since the fixed control pressure Pc is also supplied to the second pilot pressure receiving portion 28b of the second servo valve 28, the tilt rotation amount of the second hydraulic motor 2 is increased to the maximum tilt rotation amount and is held at that amount. Accordingly, the second hydraulic motor also provides a low speed and a high torque. As mentioned above, until the vehicle speed reaches about 13 km/h at a time of increasing the speed, it is possible for the Hi-Lo mode switch to freely switch the small tilt rotation holding valve 13A between its floating position and its extension position.

(2.2) Operation when the vehicle speed is increasing and the vehicle speed shown in FIGS. 6A and 6B is in a high speed range over 16 km/h When the vehicle speed pressure signal Pv becomes a high pressure in a state wherein the Hi-Lo switching electromagnetic valve 13B and the maximum tilt rotation holding valve 21A are switched to their Hi position, the clutch switching valve 24A is moved to its position b after the tilt rotation holding control valve 11B is moved to its position b. Accordingly, the fixed control pressure Pc is supplied to the float side pilot pressure receiving portion of the small tilt rotation holding valve 13A and to the pilot pressure receiving portion of the zero tilt rotation holding valve 11A. Then, the pressurized oil in the extension side pilot pressure receiving portion of the small tilt rotation holding valve 13A and the pressurized oil in the pilot pressure receiving portion of the maximum tilt rotation holding valve 21A are drained. Accordingly, as shown in FIG. 6B, the small tilt rotation holding valve 13A is switched to its floating position, and the zero tilt rotation holding valve 11A is switched to its communication position, thereby making the stopper cylinder 14 to be in its floating state.

On the other hand, the pressurized oil in the second pilot pressure receiving portion 28b of the second servo valve 28 is drained via the Hi position of the maximum tilt rotation holding valve 21A and the position b of the tilt rotation holding control valve 11B. Accordingly, the tilt rotation amount of the second hydraulic motor 2 is reduced because the holding action, for keeping the tilt rotation amount of the second hydraulic motor 2 at the maximum amount, is canceled, as shown in FIGS. 6A and 6B.

Since the zero tilt rotation holding valve 11A is at its communication position, the pressurized oil Pac is supplied to the second pilot pressure receiving portion 8b of the first servo valve 8 via the shuttle valve 9, the communication position of the zero tilt rotation holding valve 11A, and the shuttle valve 12. However, since the pressure receiving area of the second pilot pressure receiving portion 8b is greater than that of the first pilot pressure receiving portion 8a, the pressurized oil Pac controls until the first opening of the first servo valve 8 becomes maximum after overcoming the urging force due to the pressurized oil Pao of the first pilot pressure receiving portion 8a and the urging force due to the spring 8c. Accordingly, the pressurized oil Pao is supplied to the rod chamber 7a of the first tilt rotation cylinder 7; however, the pressurized oil Pao is also supplied to the bottom chamber 7b of the first tilt rotation cylinder 7 from the A port of the first servo valve 8, and the piston rod 7c moves in the leftward direction (with reference to the drawings) due to the difference between the pressure receiving area of the rod chamber 7a and the pressure receiving area of the bottom chamber 7b. At this time, since the small tilt rotation holding valve 13A is still at its floating position, the piston rod 14a of the stopper cylinder 14 is pressed by the stopper 7d, which is fixed to the piston rod 7c of the first tilt rotation cylinder 7, so as to move to the substantially zero tilt rotation amount, thereby holding the tilt rotation amount of the first hydraulic motor 1 at substantially zero.

Thereafter, when the vehicle speed reaches 19 km/h, the fixed control pressure Pc is supplied to the clutch 5 via the position b of the clutch switching valve 24A. Accordingly, the clutch 5 changes to its disengaged state, and the vehicle is driven only by the second hydraulic motor 2, as shown in FIG. 6A.

(2.3) Operation when the vehicle speed is reducing and the vehicle speed shown in FIGS. 6A and 6B is in a high speed range over 16 km/h In the same manner as with the operation in the high speed range at the vehicle speed increasing time, the Hi-Lo switching electromagnetic valve 13B and the maximum tilt rotation holding valve 21A are still switched to their Hi position, the zero tilt rotation holding valve 11A is still switched to its communication position, the small tilt rotation holding valve 13A is still switched to its floating position, and the clutch switching valve 24A is still switched to its position b. Accordingly, the tilt rotation amount of the first hydraulic motor 1 is held at substantially zero, but the holding action, for maximizing the tilt rotation amount of the second hydraulic motor 2, is canceled and is in the free state. Therefore, the pressurized oil Pbr of the second main circuit 18, increased by the speed reduction of the vehicle, acts on the first pilot pressure receiving portion 28a of the second servo valve 28 via the shuttle valve 29 so as to maximize the second opening of the second servo valve 28. Accordingly, the oil pressure in the bottom chamber 27b of the second tilt rotation cylinder 27 becomes high, and the tilt rotation amount of the second hydraulic motor 2 becomes the maximum, as shown by a broken line in FIG. 6A, so as to reduce the speed of the vehicle by the maximum brake torque of the second hydraulic motor 2.

In this case, when the solenoid of the Hi-Lo switching electromagnetic valve 13B is magnetized so as to be in its Lo mode, the Hi-Lo switching electromagnetic valve 13B is switched to its Lo position, as shown in FIG. 5. Accordingly, the fixed control pressure Pc is supplied to the extension side pilot pressure receiving portion of the small tilt rotation holding valve 13A and to the pilot pressure receiving portion of the maximum tilt rotation holding valve 21A. Further, the fixed control pressure Pc is also supplied via the position b of the tilt rotation holding control valve 11B to the floating side pilot pressure receiving portion of the small tilt rotation holding valve 13A and to the pilot pressure receiving portion of the zero tilt rotation holding valve 11A; however, the small tilt rotation holding valve 13A is switched to its floating position due to the spring force, the stopper 7d is brought into contact with the extended piston rod 14a, and the tilt rotation amount of the first hydraulic motor 1 is reduced to the zero tilt rotation amount and is held at that amount. At the same time, since the fixed control pressure Pc is supplied via the Lo position of the maximum tilt rotation holding valve 21A to the second pilot pressure receiving portion 28b of the second servo valve 28, the tilt rotation amount of the second hydraulic motor 2 increases to the maximum amount and becomes held at that amount. Accordingly, the second hydraulic motor 2 also operates at a low speed and a high torque. Further, when the vehicle speed is reduced, as shown in FIG. 6B, to a degree equal to or less than about 19 km/h, the clutch switching valve 24A is switched to its position a and the clutch pressurized oil is drained, so that the clutch 5 changes to its engaged state.

Further, the vehicle speed pressure signal Pv from the hydraulic vehicle speed detecting means 32A is inputted via the slow return valve 25 to the pilot pressure receiving portion of the tilt rotation holding control valve 11B. Accordingly, the pilot pressure of the tilt rotation holding control valve 11B, at a time of reducing the speed, is not the first predetermined value of the vehicle speed pressure signal Pv corresponding to the vehicle speed of 16 km/h but is the second predetermined value of the vehicle speed pressure signal Pv corresponding to a low vehicle speed which is lower than the vehicle speed of 16 km/h. The low vehicle speed corresponds to a value determined in accordance with an orifice diameter of the slow return valve 25, a reduction speed of the vehicle speed, and the like, and is 15 km/h in this embodiment.

In this case, when switching from the Hi mode to the Lo mode before the vehicle speed is reduced to 15 km/h, the tilt rotation holding control valve 11B is immediately switched to its position a.

(2.4) Operation when the vehicle speed is reducing and the vehicle speed shown in FIGS. 6A and 6B is in a low speed range equal to or less than 16 km/h When the vehicle speed is reduced to 15 km/h, the tilt rotation holding control valve 11B is switched from its position b to its position a, and the control circuit is in the state shown in FIG. 4 in the same manner as with the operation in the low speed range at a time of increasing the vehicle speed as explained with regard to (2.1) supra. That is, the holding action, for maintaining the tilt rotation amount of the first hydraulic motor 1 at substantially zero, is canceled, as shown in FIG. 6B.

The canceling state of the holding action, for maintaining the tilt rotation amount of the first hydraulic motor 1 at substantially zero, is continued until the vehicle speed is reduced to 15 km/h at a time of reducing the vehicle speed, in contrast to the canceling state being continued until the vehicle speed is increased to 16 km/h at a time of increasing the vehicle speed. As mentioned above, a hunting of the control can be prevented by making the first vehicle speed (16 km/h), for switching the zero tilt rotation amount at a time of increasing the speed from the cancellation of the holding action to the effecting of the holding action, and the second vehicle speed (15 km/h), for switching the zero tilt rotation amount at a time of reducing the speed from the holding action to the cancellation of the holding action, different from each other. Further, the tilt rotation amount of the first hydraulic motor 1 at a time of canceling the holding action, for maintaining the tilt rotation amount of the first hydraulic motor 1 at a time of reducing the speed at substantially zero (the first vehicle speed: 15 km/h), becomes smaller than the tilt rotation amount of the first hydraulic motor 1 at a time of increasing the speed, and the brake torque is reduced. Accordingly, the speed reduction shock can be prevented, even when the acceleration performance at a time of increasing the speed is improved. Further, since the hydraulic control can be performed in place of the electronic control, the freedom of selecting the control apparatus is improved.

As mentioned above, the zero tilt rotation holding valve 11A is in its closed position, the small tilt rotation holding valve 13A is in its floating position, and the stopper cylinder 14 is in its floating state. Since the pressurized oil Pac begins to increase after canceling the holding action, for maintaining the tilt rotation amount of the first hydraulic motor 1 at substantially zero, the tilt rotation amount of the first hydraulic motor 1 increases from the minimum to the maximum (thereby going through the small tilt rotation amount) as shown in FIG. 6A. Accordingly, the tilt rotation amount of the first hydraulic motor 1 is increased, even when the tilt rotation amount of the second hydraulic motor 2 is kept at the maximum tilt rotation amount, whereby the vehicle speed is reduced. When the vehicle speed is 4 km/h or less, the tilt rotation amount of each of the first and second hydraulic motors 1 and 2 is maximized; however, the oil amount relieved via a relief valve provided in a main circuit (not shown) is increased, so that the vehicle speed is further reduced.

In this case, with respect to each of the numerical values 13, 15, 16, 18 and 19 km/h, indicating vehicle speeds and employed for making the explanation of the first and second embodiments easy, it is sufficient that they satisfy a dimensional relation therebetween, and the apparatus is not limited to the specifically stated numerical values. Since the relation between the vehicle speed, the respective rotating speeds of the first and second hydraulic motors 1 and 2, and the traction force is the same as that of the first embodiment shown in FIG. 3, the explanation thereof will be omitted.

As mentioned above, in accordance with the present invention, when the tilt rotation amount of the first hydraulic motor 1 is held at the substantially zero state, all of the oil discharged from the hydraulic pump 16 is supplied only to the second hydraulic motor 2, and the drive shaft 3 is driven only by the second hydraulic motor 2. Accordingly, the torque of the drive shaft 3 is reduced to the degree that the tilt rotation amount of the first hydraulic motor 1 is zero; however, the rotating speed of the second hydraulic motor, that is, the rotating speed of the drive shaft 3, is increased to the degree of the oil amount for driving the first hydraulic motor 1. Therefore, since it is not necessary to provide the communicating and shutting valve for handling the maximum throughput of one of the hydraulic motors in accordance with the prior art, a high torque, low speed drive and a low torque, high speed drive can be obtained with an apparatus of compact size and low cost. A speed change shock and a load slip of the first and second hydraulic motors 1 and 2 can be securely prevented.

Reasonable variations and modifications are possible within the scope of the foregoing description, the drawings, and the appended claims to the invention.

That which is claimed is:

1. An apparatus comprising:
   a drive shaft;
   a clutch;
   a plurality of hydraulic motors for driving said drive shaft, said plurality of hydraulic motors including a first hydraulic motor and a second hydraulic motor, each of said first hydraulic motor and said second hydraulic motor being a volume variable hydraulic motor, said first hydraulic motor being connectable to the drive shaft via said clutch so as to drive said drive shaft when said clutch is engaged, and said second hydraulic motor being always connected to said drive shaft to drive said drive shaft;
   first tilt rotation control means for controlling a tilt rotation amount of the first hydraulic motor by receiving a drive side pressurized oil of the first hydraulic motor; and zero tilt rotation holding means for providing a holding action for maintaining the tilt rotation amount of the first hydraulic motor at a substantially zero tilt rotation amount in a state wherein the first hydraulic motor is controlled to the substantially zero tilt rotation amount.

2. An apparatus in accordance with claim 1, further comprising:

clutch switching means, for switching said clutch between an engaged state and a disengaged state; and a controller, for outputting a command to the clutch switching means, which, at a time of increasing a speed of said drive shaft, holds the tilt rotation amount of the first hydraulic motor at substantially zero via said zero tilt rotation holding means and thereafter disengages the clutch, and which, at a time of reducing the speed of said drive shaft, engages the clutch before canceling the holding action of maintaining the tilt rotation amount of the first hydraulic motor at substantially zero.

3. An apparatus in accordance with claim 1, wherein said first tilt rotation control means comprises:

a first tilt rotation cylinder, for controlling the tilt rotation amount of said first hydraulic motor; and a first servo valve, for receiving a drive side pressurized oil of the first hydraulic motor, so as to output a control pressure to the first tilt rotation cylinder.

4. An apparatus in accordance with claim 3, further comprising:

clutch switching means, for switching said clutch between an engaged state and a disengaged state; and a controller, for outputting a command to the clutch switching means, which, at a time of increasing a speed of said drive shaft, holds the tilt rotation amount of the first hydraulic motor at substantially zero via said zero tilt rotation holding means and thereafter disengages the clutch, and which, at a time of reducing the speed of the drive shaft, connects the clutch before canceling the holding action of maintaining the tilt rotation amount of the first hydraulic motor at substantially zero.

5. An apparatus in accordance with claim 3, wherein said zero tilt rotation holding means comprises:

a zero tilt rotation holding valve for controlling the first servo valve in a direction that the first tilt rotation cylinder reduces the tilt rotation amount of the first hydraulic motor, and stopper means for stopping the first tilt rotation control means at a position where the tilt rotation amount of the first hydraulic motor is substantially zero.

6. An apparatus in accordance with claim 5, further comprising:

clutch switching means, for switching said clutch between an engaged state and a disengaged state; and a controller, for outputting a command to the clutch switching means, which, at a time of increasing a speed of said drive shaft, holds the tilt rotation amount of the first hydraulic motor at substantially zero via said zero tilt rotation holding means and thereafter disengages the clutch, and which, at a time of reducing the speed of the drive shaft, connects the clutch before canceling the holding action of maintaining the tilt rotation amount of the first hydraulic motor at substantially zero.

7. An apparatus in accordance with claim 5, wherein said stopper means comprises:

a stopper, which is fixed to a piston rod of said first tilt rotation cylinder; and a stopper cylinder, having a piston rod which is selectively brought into contact with the stopper.

8. An apparatus in accordance with claim 7, further comprising:

clutch switching means, for switching said clutch between an engaged state and a disengaged state; and a controller, for outputting a command to the clutch switching means, which, at a time of increasing a speed of said drive shaft, holds the tilt rotation amount of the first hydraulic motor at substantially zero via said zero tilt rotation holding means and thereafter disengages the clutch, and which, at a time of reducing the speed of said drive shaft, connects the clutch before canceling the holding action of maintaining the tilt rotation amount of the first hydraulic motor at substantially zero.

9. An apparatus in accordance with claim 1, wherein said zero tilt rotation holding means comprises:

a zero tilt rotation holding valve for controlling the first servo valve in a direction that the first tilt rotation cylinder reduces the tilt rotation amount of the first hydraulic motor, and stopper means for stopping the first tilt rotation control means at a position where the tilt rotation amount of the first hydraulic motor is substantially zero.

10. An apparatus in accordance with claim 1, further comprising:

small tilt rotation holding means, for holding the tilt rotation amount of said first hydraulic motor to a small tilt rotation amount, which is a small predetermined amount greater than zero; and a small tilt rotation holding valve for driving the small tilt rotation holding means.

11. An apparatus in accordance with claim 1, further comprising:

clutch switching means, for switching said clutch between an engaged state and a disengaged state;

a rotation sensor, for detecting a rotating speed of said drive shaft; and a controller for:

(a) inputting a rotating speed signal for the drive shaft from the rotation sensor, (b) outputting to the zero tilt rotation holding means:

at a time of increasing the speed of the drive shaft, a command that cancels the holding action for maintaining the tilt rotation amount of said first hydraulic motor at substantially zero in a state wherein the rotational speed of the drive shaft is equal to or less than a first predetermined speed, and that holds the tilt rotation amount of the first hydraulic motor at substantially zero in a state wherein the rotational speed of the drive shaft is greater than the first predetermined speed, and at a time of decreasing the speed of the drive shaft, a command that holds the tilt rotation amount of the first hydraulic motor at substantially zero in a state wherein the rotational speed of the drive shaft is equal to or greater than a second predetermined speed, and that cancels the holding action for maintaining the tilt rotation amount of said first hydraulic motor at substantially zero in a state wherein the rotational speed of the drive shaft is less than the second predetermined speed, and (c) outputting to the clutch switching means:
at a time of increasing the speed of the drive shaft, a command that disengages said clutch after holding the tilt rotation amount of the first hydraulic motor at substantially zero, and
at a time of decreasing the speed of the drive shaft, a command that engages the clutch before canceling the holding action for maintaining the tilt rotation amount of the first hydraulic motor at substantially zero.

12. An apparatus in accordance with claim 11, wherein said zero tilt rotation holding means comprises:
a zero tilt rotation holding valve for controlling the first servo valve in a direction that the first tilt rotation cylinder reduces the tilt rotation amount of the first hydraulic motor, and
stopper means for stopping the first tilt rotation control means at a position where the tilt rotation amount of the first hydraulic motor is substantially zero.

13. An apparatus in accordance with claim 11, wherein said first tilt rotation control means comprises:
a first tilt rotation cylinder, for controlling the tilt rotation amount of said first hydraulic motor; and
a first servo valve, for receiving a drive side pressurized oil of the first hydraulic motor, so as to output a control pressure to the first tilt rotation cylinder.

14. An apparatus in accordance with claim 13, wherein said zero tilt rotation holding means comprises:
a zero tilt rotation holding valve for controlling the first servo valve in a direction that the first tilt rotation cylinder reduces the tilt rotation amount of the first hydraulic motor, and
stopper means for stopping the first tilt rotation control means at a position where the tilt rotation amount of the first hydraulic motor is substantially zero.

15. An apparatus in accordance with claim 11, further comprising:
a tilt rotation cylinder, for controlling a tilt rotation amount of said second hydraulic motor;
a servo valve, for outputting a control pressure to the second tilt rotation cylinder in accordance with a pressurized oil of a higher pressured one of a suction conduit and a discharge conduit of the second hydraulic motor; and
a maximum tilt rotation holding valve, for controlling the servo valve so that the tilt rotation cylinder holds the tilt rotation amount of the second hydraulic motor at its maximum,
wherein at a time of increasing the speed of said drive shaft, said controller outputs to the maximum tilt rotation holding valve a signal which holds the tilt rotation amount of the second hydraulic motor to its maximum when canceling the holding action of maintaining the tilt rotation amount of said first hydraulic motor at substantially zero, and which cancels the holding action of maintaining the tilt rotation amount of the second hydraulic motor at its maximum when holding the tilt rotation amount of the first hydraulic motor at substantially zero;
wherein, at a time of decreasing the speed of said drive shaft, said controller outputs to the maximum tilt rotation holding valve a signal which cancels the holding action of maintaining the tilt rotation amount of the second hydraulic motor at its maximum when holding the tilt rotation amount of the first hydraulic motor at substantially zero, and which holds the tilt rotation amount of the second hydraulic motor at its maximum when canceling the holding action of maintaining the tilt rotation amount of the first hydraulic motor at substantially zero.

16. An apparatus in accordance with claim 1, further comprising;
clutch switching means, for switching said clutch between an engaged state and a disengaged state;
hydraulic vehicle speed detecting means, for indicating a vehicle speed by a vehicle speed pressure signal which is proportional to the vehicle speed; and
control valve means, for:
(a) inputting a vehicle speed pressure signal from the hydraulic vehicle speed detecting means,
(b) outputting a pressure signal to the zero tilt rotation holding means that:
at a time of increasing a speed of the vehicle, cancels the holding action for maintaining the tilt rotation amount of said first hydraulic motor at substantially zero in a state wherein the vehicle speed pressure signal is equal to or less than a first predetermined value, and that holds the tilt rotation amount of the first hydraulic motor at substantially zero in a state wherein the vehicle speed pressure signal is greater than the first predetermined value,
at a time of decreasing the speed of the vehicle, holds the tilt rotation amount of the first hydraulic motor at substantially zero in a state wherein the vehicle speed pressure signal is greater than a second predetermined value which is lower than said first predetermined value, and that cancels the holding action for maintaining the tilt rotation amount of the first hydraulic motor at substantially zero in a state wherein the vehicle speed pressure signal is equal to or less than the second predetermined value, and
(c) outputting to the clutch switching means a pressure signal that:
at a time of increasing the speed of the vehicle, disengages said clutch after holding the tilt rotation amount of the first hydraulic motor at substantially zero, and
at a time of decreasing the speed of the vehicle, engages the clutch before canceling the holding action for maintaining the tilt rotation amount of the first hydraulic motor at substantially zero.

17. An apparatus in accordance with claim 16, further comprising:
a tilt rotation cylinder, for controlling a tilt rotation amount of said second hydraulic motor;
a servo valve, for outputting a control pressure to the tilt rotation cylinder in accordance with a pressurized oil of a higher pressured one of a suction conduit and a discharge conduit of the second hydraulic motor; and
a maximum tilt rotation holding valve, for controlling the servo valve so that the tilt rotation cylinder holds the tilt rotation amount of the second hydraulic motor at its maximum;
wherein said control valve means outputs a pressure signal which holds the tilt rotation amount of the second hydraulic motor at its maximum when canceling the holding action for maintaining the tilt rotation amount of said first hydraulic motor at substantially zero, and which cancels the holding action for maintaining the tilt rotation amount of the second hydraulic motor at its maximum when holding the tilt rotation amount of the first hydraulic motor at substantially zero.

18. An apparatus in accordance with claim 17, further comprising:

small tilt rotation holding means, for holding the tilt rotation amount of said first hydraulic motor to a small tilt rotation amount, which is a small predetermined amount greater than zero; and a small tilt rotation holding valve for driving the small tilt rotation holding means;

wherein said control valve means outputs to the maximum tilt rotation holding valve a pressure signal for holding the tilt rotation amount of said second hydraulic motor at a maximum when outputting to the small tilt rotation holding valve a pressure signal for holding the tilt rotation amount of the first hydraulic motor at a small tilt rotation amount.

19. An apparatus in accordance with claim 16, further comprising:

small tilt rotation holding means, for holding the tilt rotation amount of said first hydraulic motor to a small tilt rotation amount, which is a small predetermined amount greater than zero; and a small tilt rotation holding valve for driving the small tilt rotation holding means;

wherein said control valve means outputs to a maximum tilt rotation holding valve a pressure signal for holding the tilt rotation amount of said second hydraulic motor at a maximum when outputting to the small tilt rotation holding valve a pressure signal for holding the tilt rotation amount of the first hydraulic motor at a small tilt rotation amount.

* * * * *